(12) United States Patent
James

(10) Patent No.: US 11,511,405 B2
(45) Date of Patent: Nov. 29, 2022

(54) RAIL BOND TOOL

(71) Applicant: Bentworth James, Hollis, NY (US)

(72) Inventor: Bentworth James, Hollis, NY (US)

( * ) Notice: Subject to any disclaimer, the term of this patent is extended or adjusted under 35 U.S.C. 154(b) by 468 days.

(21) Appl. No.: 16/525,512

(22) Filed: Jul. 29, 2019

(65) Prior Publication Data

US 2021/0031343 A1 Feb. 4, 2021

(51) Int. Cl.
*B25B 27/02* (2006.01)
*B60M 5/00* (2006.01)

(52) U.S. Cl.
CPC .............. *B25B 27/02* (2013.01); *B60M 5/00* (2013.01)

(58) Field of Classification Search
CPC ......... B25B 27/02; B25B 27/14; B25B 27/18; B25C 11/00; B60M 5/00; Y10T 29/53683; Y10T 29/53909; Y10T 29/5393; Y10T 29/53943; Y10T 29/53952; B66F 15/00; B61L 1/181; B61L 13/002
See application file for complete search history.

(56) References Cited

U.S. PATENT DOCUMENTS 3,109,233 A * 11/1963 Temple .................... B60M 5/00
29/863
5,479,688 A * 1/1996 Rubino ................. B25B 27/023
29/259

* cited by examiner

*Primary Examiner* — Anne M Kozak
*Assistant Examiner* — Christopher Soto
(74) *Attorney, Agent, or Firm* — Harvey Lunenfeld

(57) ABSTRACT

A rail bond tool for installation and removal of a rail bond to and from a web of a track rail having: a socket adapted to removably and matingly fit about a rail bond head and a rail bond terminal of the rail bond, the socket interior having: an upper cylindrical wall portion, a lower cylindrical wall having a larger diameter than the upper cylindrical wall portion, and an intermediate frustoconical wall portion, an opening at a distal end of the socket adjacent the rail bond tool, the upper cylindrical wall portion, the intermediate frustoconical wall portion, and the lower cylindrical wall adapted to removably and matingly receive the rail bond head, a socket exterior wall, and a slot extending from the opening through the lower cylindrical wall and the intermediate frustoconical wall to the socket exterior wall portion, the slot adapted to removably receive the rail bond terminal.

27 Claims, 27 Drawing Sheets

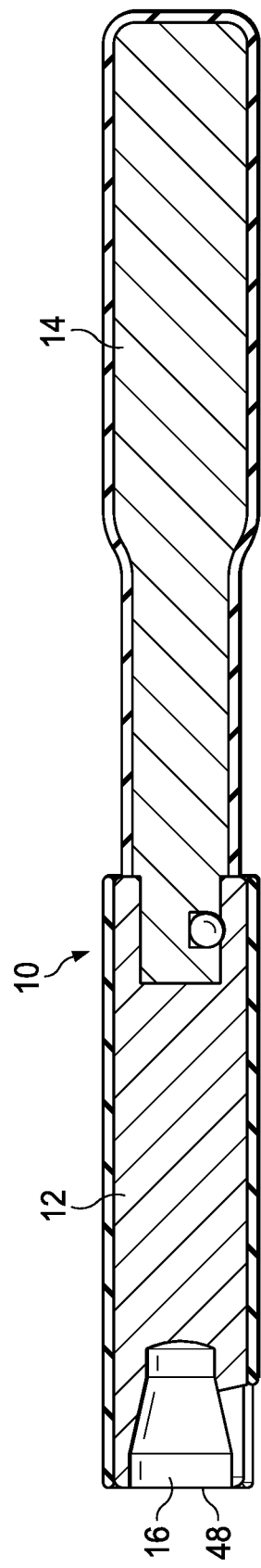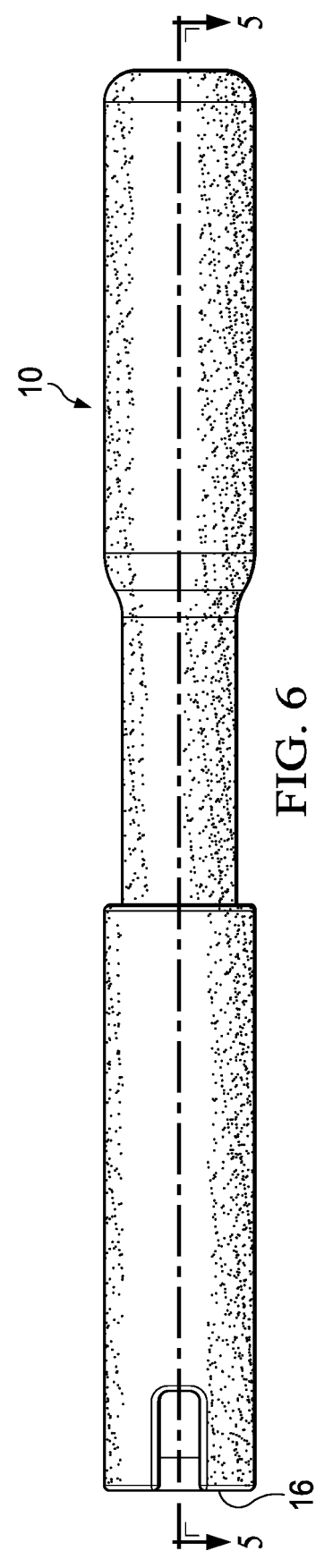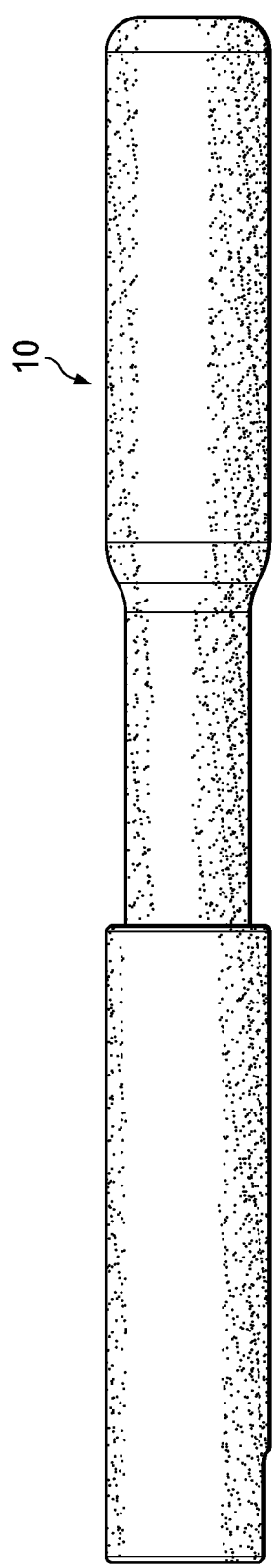

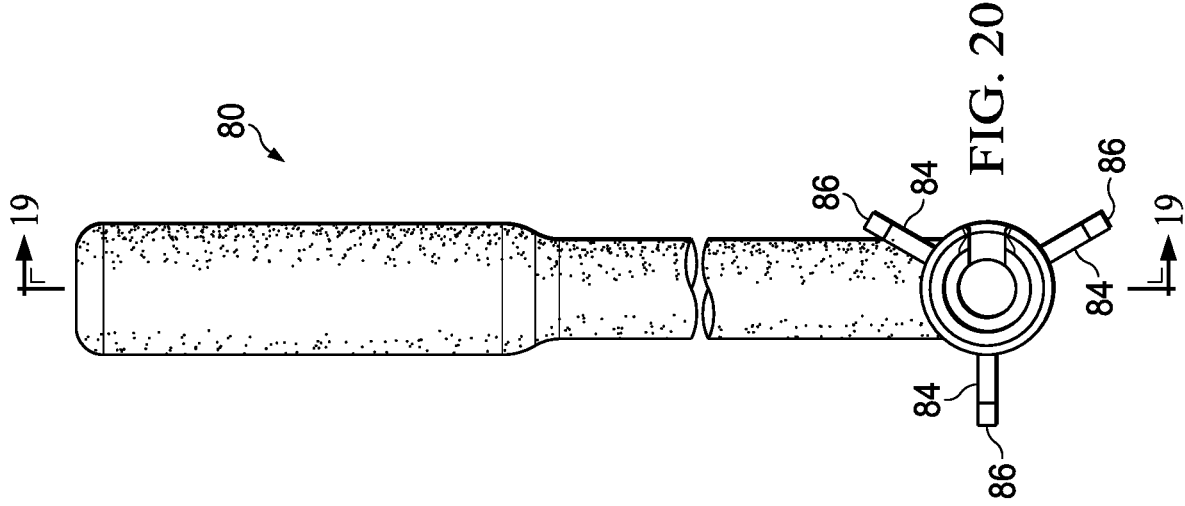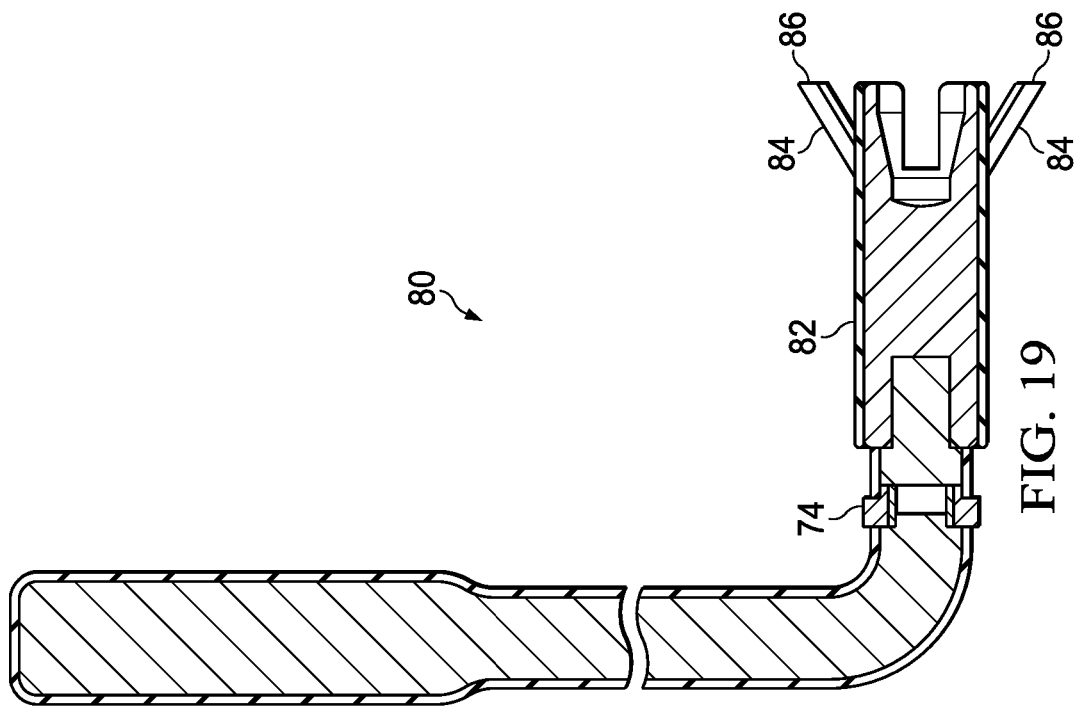

RAIL BOND TOOL

BACKGROUND OF THE INVENTION

Field of the Invention

The present invention relates generally to tools for rail bonds and more particularly to rail bond removal and installation tools.

BACKGROUND ART

Rail transport began in the sixth century BC in Ancient Greece, according to present day knowledge. Wheeled vehicles were pulled by men and animals along limestone grooves, which provided track elements for the wheels. Boats were transported across the Isthmus of Corinth in Greece, using this approach from around 600 BC to approximately the first century AD. Paved trackways were later built in Roman Egypt.

Several centuries later, wooden rails were introduced circa 1515. A funicular railway in Austria used wooden rails and a rope operated by human or animal power through a treadwheel, an updated version of which still exists and is operational today.

Later, in the 1550's, wagonways and tramways with wooden rails were used to transport ore to and from mines, using carts with unflanged wheels running on wooden planks and vertical pins in the gaps between the planks to keep the carts moving in the proper direction. Wagonways were introduced to England in the 1560's and later, circa the 1600's.

Centuries later: the advent of metal wheels; improvements in track design and manufacturing; the introduction of the steam engine and improvements in locomotive design and construction; and the development of the track circuit changed the future of rail transportation.

Improvements in wheel and track design and construction started to occur in the 1750's and continued for at least the next one and one half centuries.
- The introduction of techniques to power blast air to blast furnaces, using steam engines for powering the blast air, led to a significant increase in British iron production after the mid 1750's. In the late 1760's a company in England began to fix cast iron plates to the upper surfaces of wooden rails, which increased the durability and load-bearing capacity of the rails. It should be noted, that the first railway was built in America in Lewiston, N.Y. in 1764.
- In 1787, a system was introduced in which unflanged wheels ran on L-shaped metal plates, known as plateways. Two years later, in 1789, William Jessop introduced a form of an all-iron edge rail and flanged wheels, and in 1803, Jessop opened the Surrey Iron Railway, a double track plateway in south London.
- The flanged wheel and edge-rail eventually became the standard for railways.
- Wrought iron invented by John Birkinshaw in 1820 ultimately replaced cast iron for rails, since cast iron was brittle and broke under heavy loads. Wrought iron, commonly called iron, was a ductile material that could undergo substantial deformation before breaking, making it more suitable for rail transportation.
- The introduction of the Bessemer process enabled steel to be manufactured inexpensively. Later, near the end of the 19$^{th}$ century, the open hearth furnace started to replace the Bessemer process, which resulted in an improvement in the quality of steel and steel rails and further reduced costs.
- Steel rails lasted several times longer than iron and facilitated the introduction of heavier locomotives and longer trains, which led to an era of significant expansion of railways that began in the late 1860's.

Improvements in engine and locomotive design and construction started to occur in the late 1760's, just a few years after improvements in wheel and track design and construction began and continued for at least the next two centuries.
- James Watt, a Scottish inventor and mechanical engineer, greatly improved the steam engine, developed a reciprocating engine in 1769, and patented a steam locomotive in 1784. The first full-scale working railway steam locomotive was built in the United Kingdom in 1804 by Richard Trevithick, a British engineer, which used high-pressure steam to drive the engine by one power stroke.
- In 1814, George Stephenson, inspired by the early locomotives of Trevithick, Murray and Hedley, developed his own steam-powered machine and improved the work of earlier pioneers, considerably. Stephenson played a pivotal role in the development and widespread adoption of the steam locomotive in rail transportation. This success led to Stephenson establishing his company as the pre-eminent builder of steam locomotives for railways in Great Britain, Ireland, the United States, and much of Europe. The first public railway that used only steam locomotives was Liverpool and Manchester Railway was built in 1830.
- In 1906, Rudolf Diesel, Adolf Klose and the steam and diesel engine manufacturer Gebrüder Sulzer founded Diesel-Sulzer-Klose GmbH to manufacture diesel-powered locomotives. A significant breakthrough in diesel-electric locomotive control systems occurred in 1914, when Hermann Lemp, a General Electric electrical engineer, developed and patented a reliable direct current electrical control system, which used a single lever to control both engine and generator in a coordinated fashion, and was the prototype for all diesel-electric locomotive control systems.
- The first known electric locomotive was built in 1837, using batteries (galvanic cells) to power the locomotive. However, the limited power available from batteries at the time prevented its general use.
- Werner von Siemens, on the other hand, demonstrated an electric railway in 1879 in Berlin. The world's first electric tram line, Gross-Lichterfelde Tramway, opened in Lichterfelde near Berlin, Germany, in 1881. The system was built by Siemens, and the tram ran on 180 volts DC, which was supplied to the tram by running rails. Electric trolleys were pioneered in the United States in 1888 on the Richmond Union Passenger Railway, using equipment designed by Frank J. Sprague, and in 1891 the Gross-Lichterfelde Tramway was equipped with an overhead wire and the line was extended to Berlin-Lichterfelde West station.
- The first use of electrification on a main line was on a four-mile stretch of the Baltimore Belt Line of the Baltimore and Ohio Railroad (B&O) in 1895, which connected the main portion of the B&O to the new line to New York through a series of tunnels in the vicinity of Baltimore's downtown.
- Electricity quickly became the power supply of choice for subways, aided by the Sprague's invention of multipleunit train control in 1897. By the early 1900's most street railways were electrified.

A key component in the development of rail transportation was the track circuit, invented by Dr. William Robinson in 1872, which detected the absence of trains and rolling stock on tracks for safety and control purposes and changed the future of rail transportation.

Track circuits allowed railway signalling systems to operate semi-automatically, by displaying signals for trains to slow down or stop in the presence of an occupied track ahead of them, and prevented dispatchers and operators from causing accidents, both by informing them of track occupancy and by preventing signals from displaying unsafe indications.

Train detection, bonding, and bonding cables became an important facet of the rail industry for both management and safety.

Cable-to-rail connectors are required on railroads because contiguous rails must be joined electrically to complete signal and switching circuits in yards and along lines.

To ensure electrical continuity across rail joints within a track circuit, the rails on each side of the joint are bonded together or connected to one another. This has been and is typically accomplished using rail joint bonds or rail bonds.

Different rail bonds have heretofore been known.

U.S. Pat. No. 902,026 (Vogel) discloses a rail bond, which connects contiguous rails. The rail bonds have terminals that have tapered driving heads by means of which they may be readily driven into holes in the rails. Each terminal is provided with a bevel at one end thereof and is slightly tapered to facilitate it being driven into a cylindrical hole in a conductor, such as a rail.

U.S. Pat. No. 1,166,826 (Etheridge) discloses a rail-joint bond for electrically connecting track ends of track rails in a railway system.

U.S. Pat. No. 4,102,497 (Lowerre) discloses another rail bond for providing electrical connections between adjoining and parallel rail lengths, between rail and external circuits, between rail and frogs, switches and the like, including a rail bond terminal comprising a stranded conductor, an inner sleeve having a flared portion and secured to an end of the conductor, and a tapered outer sleeve having open ends into which the inner sleeve and conductor can be inserted. One end of the outer sleeve forms a head portion having an opening sufficient to receive the conductor to permit the conductor to be removed from the area of the end of the terminal to which a hammer is applied for driving the terminal into a rail or the like.

U.S. Pat. No. 3,058,764 (Scott, et. al.) discloses a rail bond connector device for joining an electrical conductor to a metal object having an externally tapered socket element adapted for driving insertion into and partially through the aperture, and having a frustoconical cavity therein closed at its narrow end, the end extending beyond the aperture after insertion, and an external wall which tapers in the same direction as the taper of the frustoconical cavity, and a tapered pin with a longitudinal groove co-extensive with its tapered end portion, the pin being adapted for driving insertion into the cavity of the socket element after one end of the conductor has been placed into the groove, whereby the socket element will be expanded, and the walls of the aperture, the socket element, the end of the conductor and the tapered pin will be swagedly wedged together to form a substantially integral connection therebetween.

U.S. Pat. No. 4,114,262 (Franck) discloses a method for connecting an electrical cable connector to another electrically conductive object in which the other object has a hole provided for receiving part of a connector element, which connector element provides a first pin dimensioned for being driven into the hole, a head having a first bore extending radially relative to a second bore, which extends coaxially with the axis of the first pin and intersecting the first bore and dimensioned for receiving a second pin dimensioned for being driven into the second bore and tightly engaging a cable received in the first bore, the method comprising inserting the cable in the first bore, placing the first pin within the hole of the object, and placing the second pin within the second bore, and applying force upon the second pin to drive the same into the second bore to engage the cable and at the same time to drive the first pin into the hole.

Rail Electrical Products, Erico, 2002, [[https://usermanual.wiki/Pdf/98643Catalog1.259382677/view,]] pages 16 and 17, disclose plug bonds and track connectors, which are designed for application to rail webs, at usermanual.wiki.

Each of the plug bonds are hammered into a ⅜ inch diameter hole drilled through the rail web (driven from the same side of the web that the hole was drilled). The track connectors are used for track connections, fouling circuits, and bonding around splice bars. The plug terminal of the track connector is hammered into a ⅜ inch diameter hole drilled through the rail web.

The plug bonds and the track connectors each have at least one substantially bell shaped bond portion, comprising an upper cylindrical portion, a substantially centrally disposed frustoconical portion, and a lower cylindrical portion having a larger diameter than the upper cylindrical portion, the upper and lower cylindrical portions adjoined to the substantially centrally disposed frustoconical portion, the plug bonds and the track connectors each having a substantially centrally disposed pin or plug adjoined to the bottom of the lower cylindrical portion, and a cable adjoined to the substantially centrally disposed frustoconical portion.

Erico also discloses "Plug Bond, Signal" [[https://www.erico.com/catalog/categories/R2230?pdf=1&language=en&country=US]] and "Plug Bond Track Connector, Signal" [[https://www.erico.com/category.asp?category=R2228]] at erico.com.

Other types of bonds are also disclosed in Rail Electrical Products, Erico, 2002, [[https://usermanual.wiki/Pdf/98643Catalog1.259382677/view]] pages 1 through 58, which are designed for application to rail webs, at usermanual.wiki and [[https://www.erico.com/catalog/literature/R603C-NAEN.pdf]] erico.com.

Rail bonds and connectors are typically installed by hammering a rail bond into the web of a rail or track, by hitting the head of the rail bond, using a hammer, lump hammer, or other impact tool. Use of a hammer or lump hammer to hammer the rail bond into the web of the rail or track, however, has the potential to damage the rail, the track, or other neighboring equipment, and is often difficult in tight situations and limited space, especially in the vicinity of turnouts, joints, point or switch rails, hell blocks, closure tails, frogs, frog rails, point blades, throw or tie bars, and/or guard rails.

Rail bonds and connectors are often removed from the rail or track, for example, for maintenance purposes by hitting the end of the rail bond, which opposes the head of the rail bond, using a hammer and a punch, a lump hammer and a punch, or other impact tool to release the rail bond from the web of the rail or track. However, this becomes a problem in tight situations and limited space, especially during peak or heavy rail traffic, while maintaining safe operating conditions.

Large numbers of rail bonds are required by railroads and subway systems. When new tracks are installed and rail bonds are installed, or removed and replaced, large numbers of rail bonds must be installed, removed, and replaced per hour quickly, easily, and efficiently.

Removal of rail bonds from the rails or tracks in a quick and efficient manner is necessary and important, especially for maintenance or replacement purposes, while maintaining safety and security of those working on and in the vicinity of the rail bonds requiring maintenance and/or removal. This becomes especially important when there is active rail traffic in the vicinity of the rail bonds that have to be removed from the rails or tracks and is often difficult in tight situations and limited space, particularly in the vicinity of turnouts, joints, point or switch rails, hell blocks, closure tails, frogs, frog rails, point blades, throw or tie bars, and/or guard rails.

Use of a hammer or lump hammer to hammer remove the rail bond from the web of the rail or track, however, has the potential to damage the rail, the track, or other neighboring equipment, and is often difficult in tight situations and limited space, particularly in the vicinity of turnouts, joints, point or switch rails, hell blocks, closure tails, frogs, frog rails, point blades, throw or tie bars, and/or guard rails.

There is thus a need for a rail bond installation and/or removal tool that is capable of simply, quickly, efficiently, and conveniently installing and/or removing rail bonds and/or connectors from rails or tracks, especially in limited space, while minimizing the possibility of damaging the rails or tracks in the vicinity of the rail bonds and while maintaining a safe working environment in the vicinity of the rail bonds to be installed and/or removed.

The rail bond tool should be easy to carry, store, and arrange into a compact shape, when not in use, and quick and easy to arrange for rail bond removal and/or installation, and should have means for gripping and/or holding the tool in a manner that minimizes the potential for dropping or losing the rail bond tool.

The rail bond tool should preferably be of cylindrical shape to facilitate ease of handling, although other suitable shapes may be used. The rail bond tool should be light weight, quick, efficient, and easy to use, handle, store, open fully or partially, as required, and facilitate rapid installation and/or removal of rail bonds and/or connectors on rails or tracks. The rail bond tool should also have means for securely holding the tool, when being used in a variety of difficult environmental conditions, such as rain, snow, wind and other difficult work environments, and be capable of being stored as an appendage to a user's belt or work belt, or in a suitable holster attached the belt or work belt.

The rail bond tool should be durable, light weight, inexpensive, safe to use, attractive, sturdy, of simple construction, and capable of being used in a quick, convenient, and efficient manner.

Different rail bond tools have heretofore been known in addition to hammers, lump hammers, and impact tools. However, none of the rail bond tools adequately satisfies these needs. None of the rail bond tools are capable of simply, quickly, and conveniently installing and/or removing rail bonds from rails or tracks, especially in limited space, while minimizing the possibility of damaging the rails or tracks in the vicinity of the rail bonds and maintaining a safe working environment.

U.S. Pat. No. 1,433,775 (Bowman) discloses a rail bonding tool including coacting jaws, one provided with a fork, a swedge mounted between the arms of the fork, a pin extending between the fork arms securing the swedge thereon, and a coacting upsetting tool carried by the other of the jaws. U.S. Pat. No. 1,433,775 (Bowman) further discloses the rail bonding tool having pivotally connected levers having coacting jaws, one provided with a head having an opening therethrough and forming an anvil, an upsetting tool seated in one end portion of the opening, the outer end portion of the opening being adapted to accommodate a bond plug resting against the anvil, and a coacting swedge carried by the other of the jaws.

U.S. Pat. No. 763,531 (Wigtel) discloses a hydraulic rail bonding tool comprising the combination of: a fixed jaw having on its underside, a seat to fit the head of a rivet; a ram underneath the fixed jaw, the face of the ram facing upward; a rivet-set on the ram to coact with the fixed jaw in upsetting rivets; and a head above the fixed jaw, the interior of the head being connected with that of the ram-cylinder below the ram by a fluid-passage.

U.S. Pat. No. 1,373,017 (Nichols) discloses a device for removing a rail bond having an expander pin, the device comprising a frame adapted to span the rail, means provided on the frame for engaging the underside of the rail head, a punch carried by the frame proportioned to first engage and displace the expander pin and progressively engage the shank of the bond and remove the bond, and means carried by the frame for exerting pressure upon the punch.

U.S. Pat. No. 2,548,424 (Wilson) discloses a bending tool for rail bond conductors, which is used to facilitate bending of the conductors of rail bonds adjacent the terminals of the bonds. Rail bonds are used to electrically connect adjacent rails or tracks, thus, allowing current to be carried by the rails for signaling and other purposes. The terminals have studs or shanks, which are driven into holes drilled in the rail webs or rail heads. Each of the bonds comprises a conductor (generally a stranded cable) having at each end a cylindrically shaped terminal, which extends transversely to the conductor. Wilson's bending tool is used to bend the conductors of the rail bonds over the splice bars but beneath the heads of the rails.

Rail Electrical Products, Erico, 2002, [[https://usermanual.wiki/Pdf/98643Catalog1.259382677/view,]] page 18, discloses a bond removal punch, which has a handle having a strap for holding a punch that may be used in conjunction with a hammer to hammer out the pin or plug portion of a bond from a rail web at usermanual.wiki.

Erico also discloses "Plug Bond Remover with Plastic Handle" at [[https://www.erico.com/catalog/categories/R3060?pdf=1&language=en&country=US]] [[https://www.erico.com/catalog/literature/R603C-NAEN.pdf]] at erico.com.

For the foregoing reasons, there is thus a need for a rail bond installation and/or removal tool that is capable of simply, quickly, efficiently, and conveniently installing and/or removing rail bonds and/or connectors from rails or tracks, especially in limited space, while minimizing the possibility of damaging the rails or tracks in the vicinity of the rail bonds and maintaining a safe working environment in the vicinity of the rail bonds to be installed and/or removed.

The rail bond tool should be easy to carry, store, and arrange into a compact shape, when not in use, and quick and easy to arrange for rail bond removal and/or installation, and should have means for gripping and/or holding the tool in a manner that minimizes the potential for dropping or losing the rail bond tool.

The rail bond tool should preferably be of cylindrical shape to facilitate ease of handling, although other suitable shapes may be used. The rail bond tool should be light weight, quick, efficient, and easy to use, handle, store, open fully or partially, as required, and facilitate rapid installation and/or removal of rail bonds and/or connectors on rails or tracks. The rail bond tool should also have means for securely holding the tool, when being used in a variety of difficult environmental conditions, such as rain, snow, wind and other difficult work environments, and be capable of being stored as an appendage to a user's belt or work belt, or in a suitable holster attached the belt or work belt.

The rail bond tool should be durable, light weight, inexpensive, safe to use, attractive, sturdy, of simple construction, and capable of being used in a quick, convenient, and efficient manner.

SUMMARY

The present invention is directed to a rail bond installation and/or removal tool that is capable of simply, quickly, efficiently, and conveniently installing and/or removing rail bonds and/or connectors from rails or tracks, especially in limited space, while minimizing the possibility of damaging the rails or tracks and while maintaining a safe working environment, during rail bond installation and/or removal.

The rail bond tool is easy to carry, store, and arrange into a compact shape, when not in use, and quick and easy to arrange for rail bond removal and/or installation, and has means for gripping and/or holding the tool in a manner that minimizes the potential for dropping or losing the rail bond tool.

The rail bond tool is of cylindrical shape to facilitate ease of handling, although other suitable shapes may be used. The rail bond tool is light weight, quick, efficient, and easy to use, handle, store, open fully or partially, as required, and facilitates rapid installation and/or removal of rail bonds and/or connectors on rails or tracks. The rail bond tool has means for securely holding the tool, when being used in a variety of difficult environmental conditions, such as rain, snow, wind and other difficult work environments, and is capable of being stored as an appendage to a user's belt or work belt, or in a suitable holster attached the belt or work belt.

The rail bond tool is durable, light weight, inexpensive, safe to use, attractive, sturdy, of simple construction, and capable of being used in a quick, convenient, and efficient manner.

A rail bond tool for installation and removal of a rail bond to and from a web of a track rail having features of the present invention comprises: a socket adapted to removably and matingly receive the rail bond head, the socket having an interior having: a rail bond tool interior upper cylindrical wall portion, a rail bond tool interior lower cylindrical wall portion having a larger diameter than the rail bond tool interior upper cylindrical wall portion, a rail bond tool interior frustoconical wall portion therebetween, an opening at a distal end of the socket adjacent the rail bond tool interior lower cylindrical wall portion having substantially the same diameter as the rail bond tool interior lower cylindrical wall portion, the rail bond tool interior upper cylindrical wall portion, the rail bond tool interior frustoconical wall portion, and the rail bond tool interior lower cylindrical wall portion adapted to removably and matingly receive the rail bond head, a socket exterior wall portion, and a slot extending from the opening through the rail bond tool interior lower cylindrical wall portion and the rail bond tool interior frustoconical wall portion to the socket exterior wall portion, the slot adapted to removably receive the rail bond terminal.

An alternate embodiment of a rail bond tool for installation and removal of a rail bond to and from a web of a track rail having features of the present invention comprises: a socket adapted to removably and matingly receive the rail bond head, the socket having an interior having: a rail bond tool interior frustoconical wall portion, an opening at a distal end of the socket having substantially the same diameter as the rail bond tool interior frustoconical wall portion, the rail bond tool interior frustoconical wall portion adapted to removably and matingly receive the rail bond head, a socket exterior wall portion, and a slot extending from the opening through the rail bond tool interior frustoconical wall portion to the socket exterior wall portion, the slot adapted to removably receive the rail bond terminal.

Another alternate embodiment of a rail bond tool for installation and removal of a rail bond to and from a web of a track rail having features of the present invention comprises: a socket adapted to removably and matingly receive the rail bond head, the socket having an interior having: a rail bond tool interior cylindrical wall portion, an opening at a distal end of the socket having substantially the same diameter as the rail bond tool interior cylindrical wall portion, the rail bond tool interior cylindrical wall portion adapted to removably and matingly receive the rail bond head, a socket exterior wall portion, and a slot extending from the opening through the rail bond tool interior cylindrical wall portion to the socket exterior wall portion, the slot adapted to removably receive the rail bond terminal.

The rail bond tool of the present invention may have: a handle connected to the socket; a substantially straight handle removably connected to the socket; a bent handle removably connected to the socket, a handle having opposing arms, or a substantially L shaped handle removably connected to the socket.

The bent handle, the handle having opposing arms, and the substantially L shaped handle each may have a locking angle adjuster for adjusting the angle of the slot of the socket and a lock for locking the angle.

The handle having opposing arms may have an opposing arm locking angle adjuster for adjusting the angle between the opposing arms and locking the angle between the opposing arms.

DRAWINGS

These and other features, aspects, and advantages of the present invention will become better understood with regard to the following description, appended claims, and accompanying drawings where:

FIG. 5 is a cross section view of the rail bond tool of FIG. 1;

FIG. 6 is a side view of the rail bond tool of FIG. 1;

FIG. 7 is another side view of the rail bond tool of FIG. 1, which is perpendicular to the side view of FIG. 7;

FIG. 19 is a side cross section of the rail bond tool of FIG. 18;

FIG. 20 is a front view of a socket of the rail bond tool of FIG. 18;

DESCRIPTION

Figures 1, 1A:
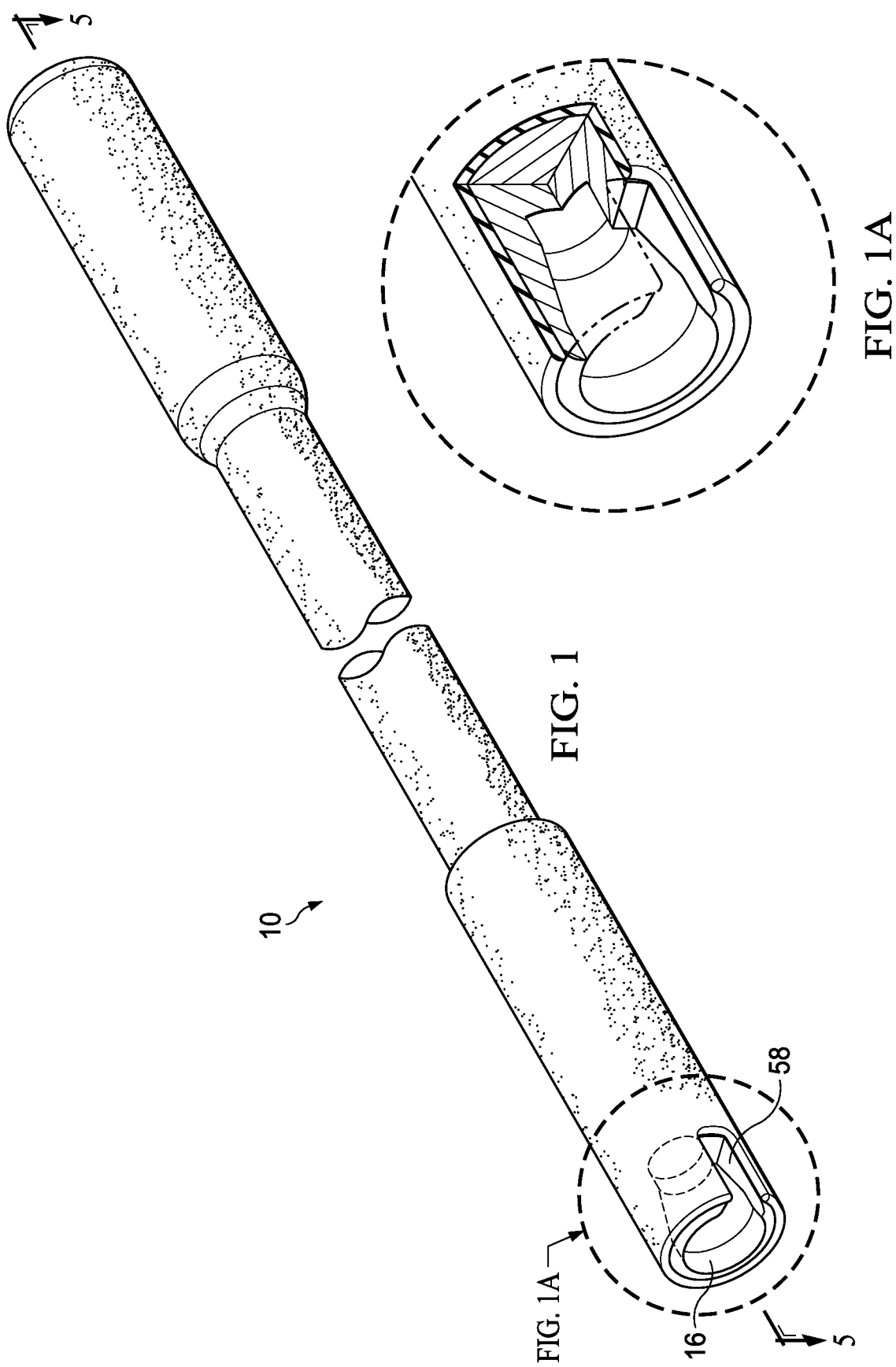
FIG. 1 is a perspective view of a rail bond tool, constructed in accordance with the present invention.
FIG. 1A is an enlarged cutaway view of the socket of the rail bond tool of FIG. 1.
Figure 2:
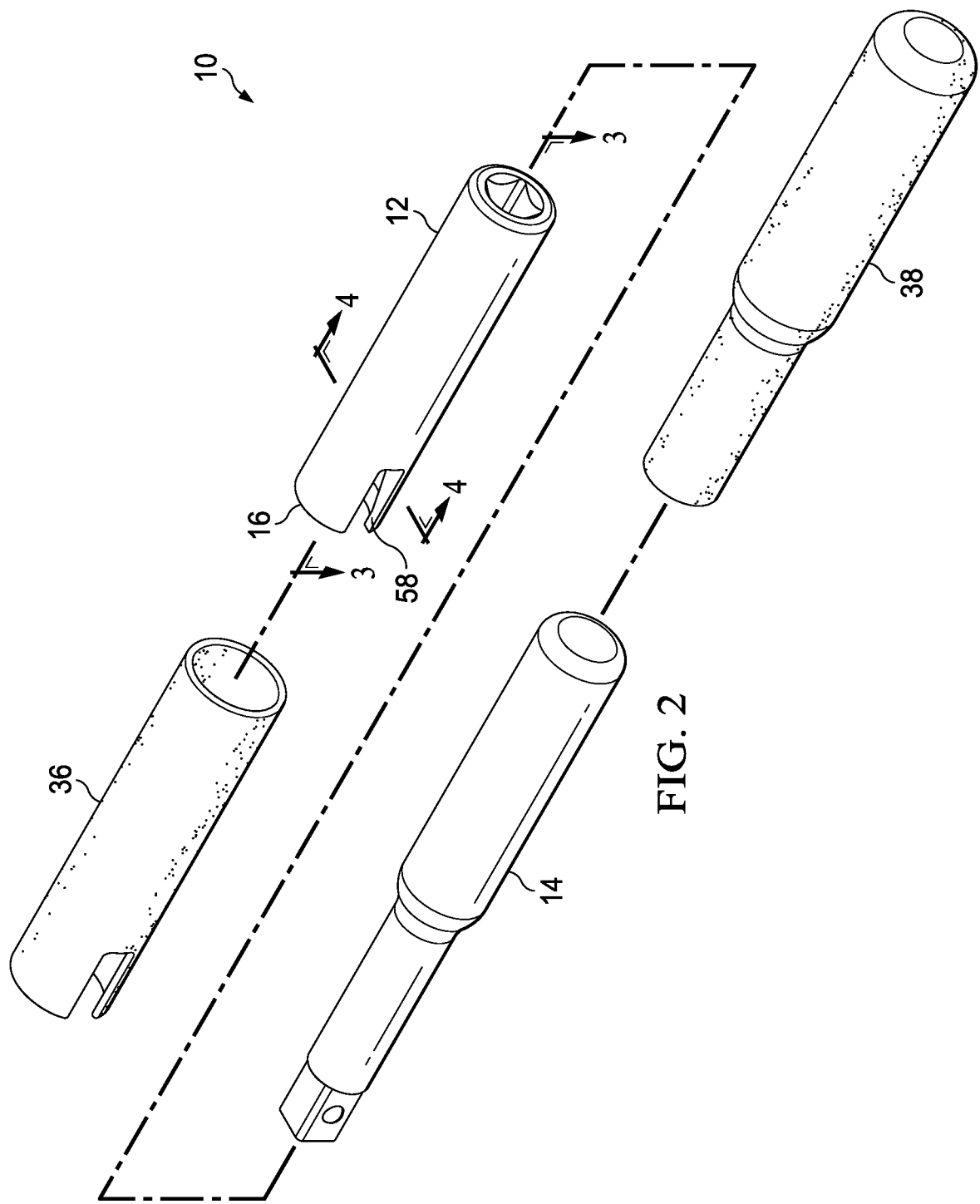
FIG. 2 is an exploded perspective view of the rail bond tool of FIG. 1.
Figure 3:
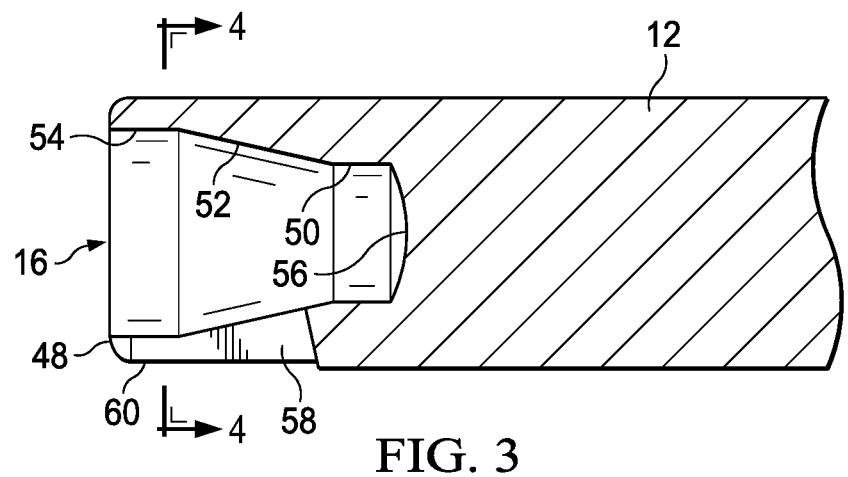
FIG. 3 is a side cross section view of a portion of the socket of the rail bond tool of FIG. 1.
Figure 4:
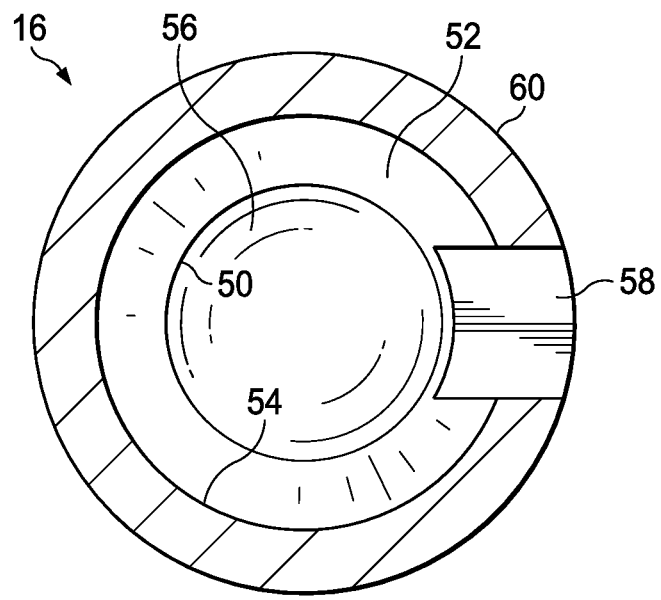
FIG. 4 is an end cross section view of the socket of the rail bond tool of FIG. 1.

The preferred embodiments of the present invention will be described with reference to FIGS. 1-34 of the drawings. Identical elements in the various figures are identified with the same reference numbers.

FIGS. 1-7 and FIGS. 8A-8D show a rail bond tool 10, constructed in accordance with the present invention, comprising a socket body 12 and a handle 14 removably connected to the socket body 12. The socket body 12 has a socket 16, which is adapted to removably and matingly fit about a portion of a rail bond 20, which is shown in FIGS. 9A and 9B.

Figure 9A:
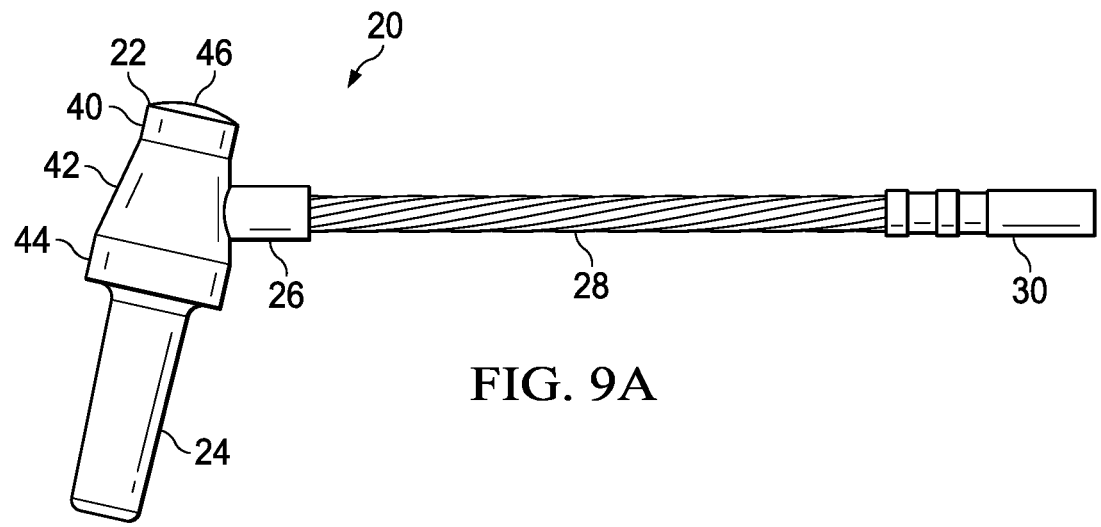
FIG. 9A is a side view of a rail bond.
Figure 9B:
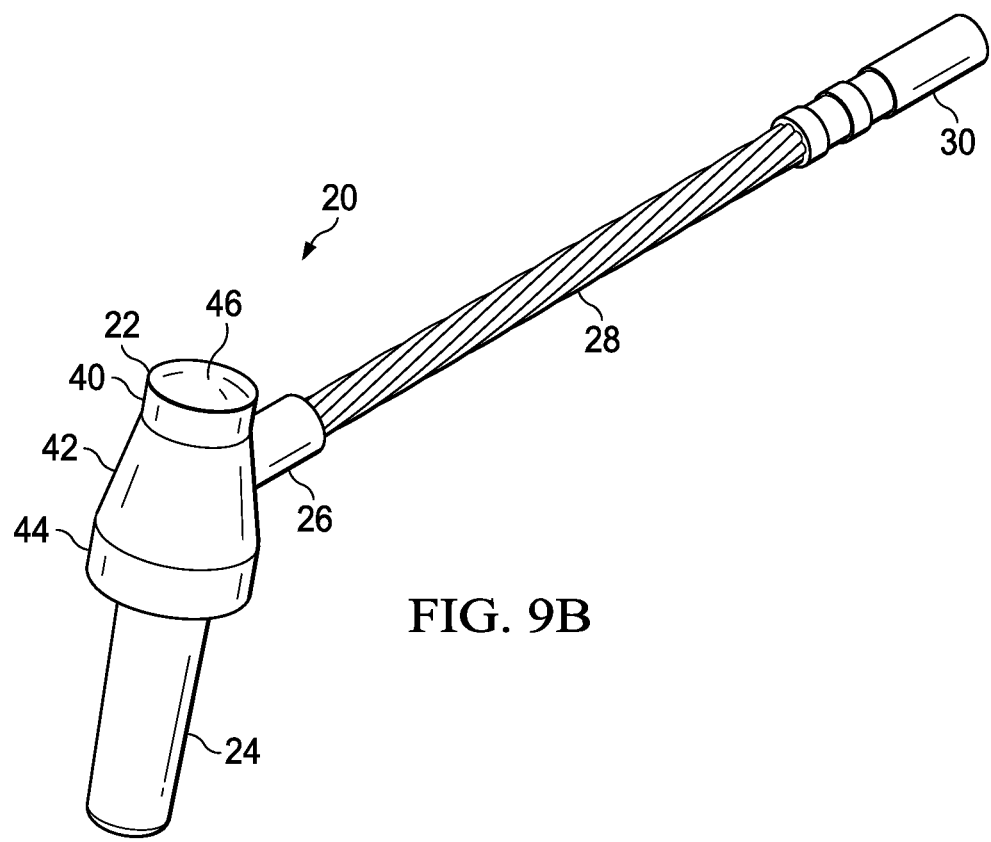
FIG. 9B is perspective view of the rail bond of FIG. 9A.

The rail bond 20, shown in FIGS. 9A and 9B, has a head 22 connected to a shank 24, a head terminal 26 connected to the head 22 of the rail bond 20, a cable 28 connected to the head terminal 26, and an end terminal 30 connected to the cable 28. The head terminal 26, which is typically cylindrical, is adjoined to the head 22 of the rail bond 20.

Figure 9C:
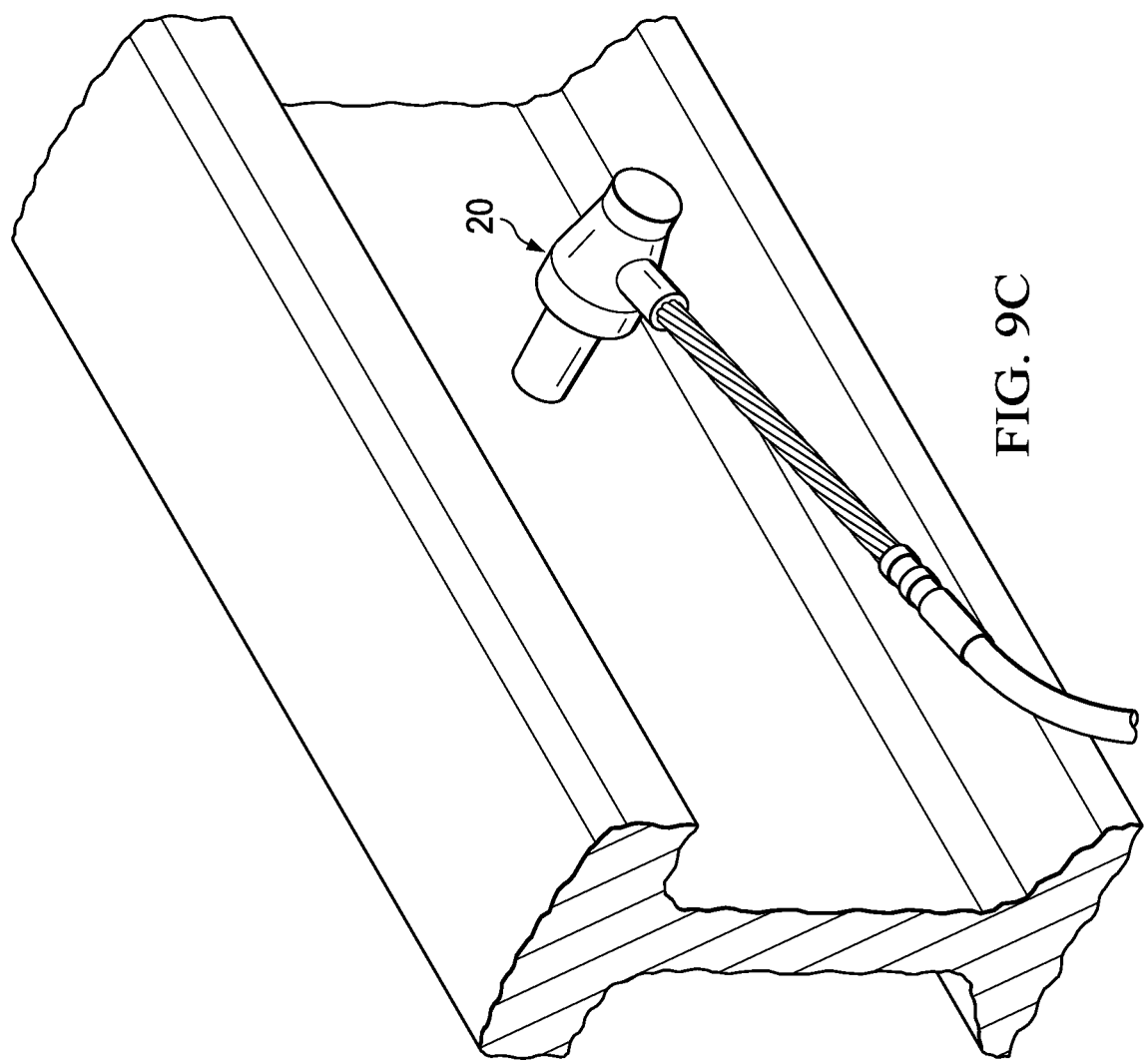
FIG. 9C is a perspective view of the rail bond of FIG. 9A mounted to a web of a track rail.

FIG. 9C shows the rail bond of FIGS. 9A and 9B mounted to a web 32 of a track rail 34.

Figure 10:
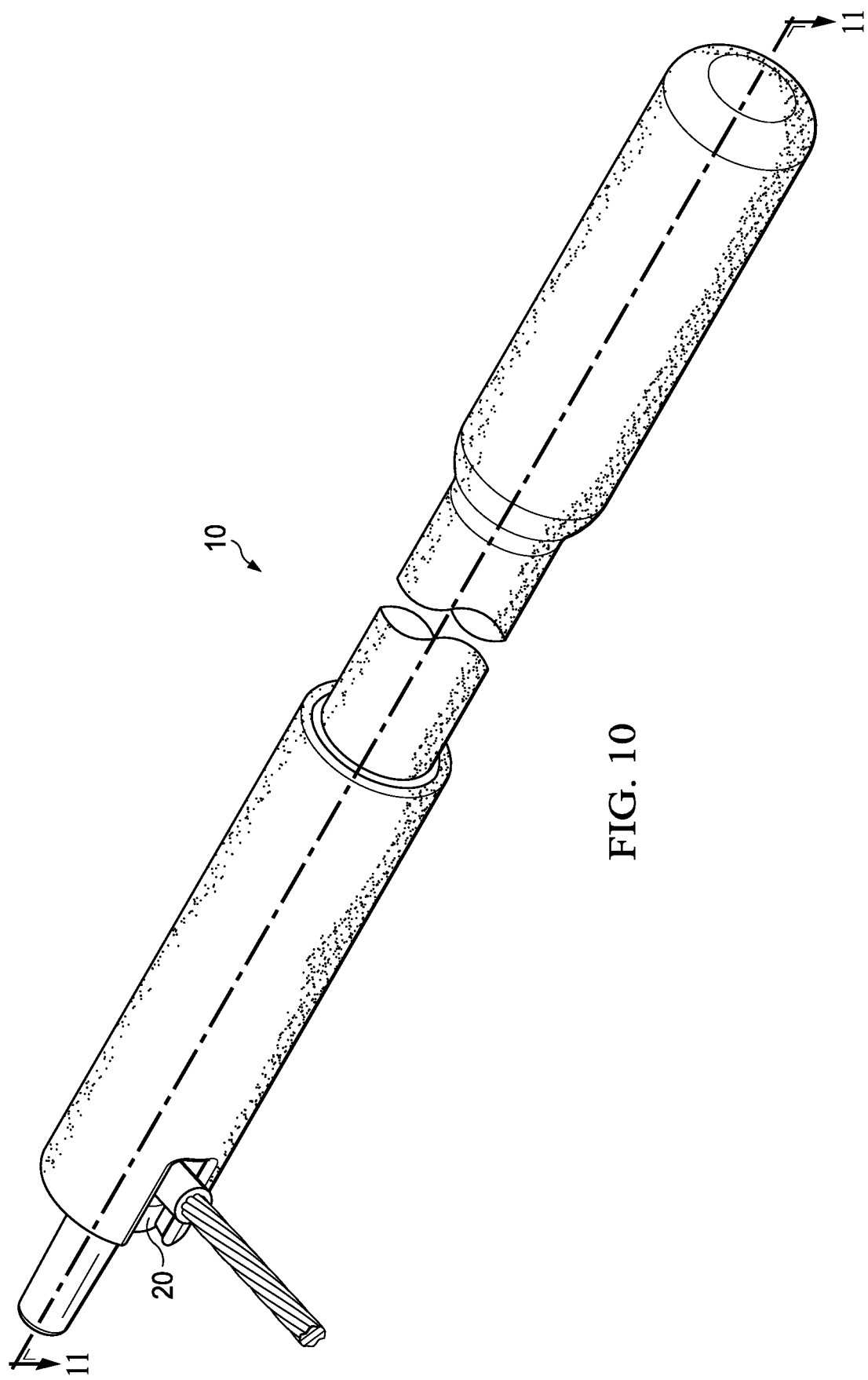
FIG. 10 is a perspective view of the rail bond tool of FIG. 1, showing a portion of the rail bond of FIGS. 9A and 9B within the socket of the rail bond tool and ready for installation and/or removal of the rail bond to or from a rail.
Figure 11:
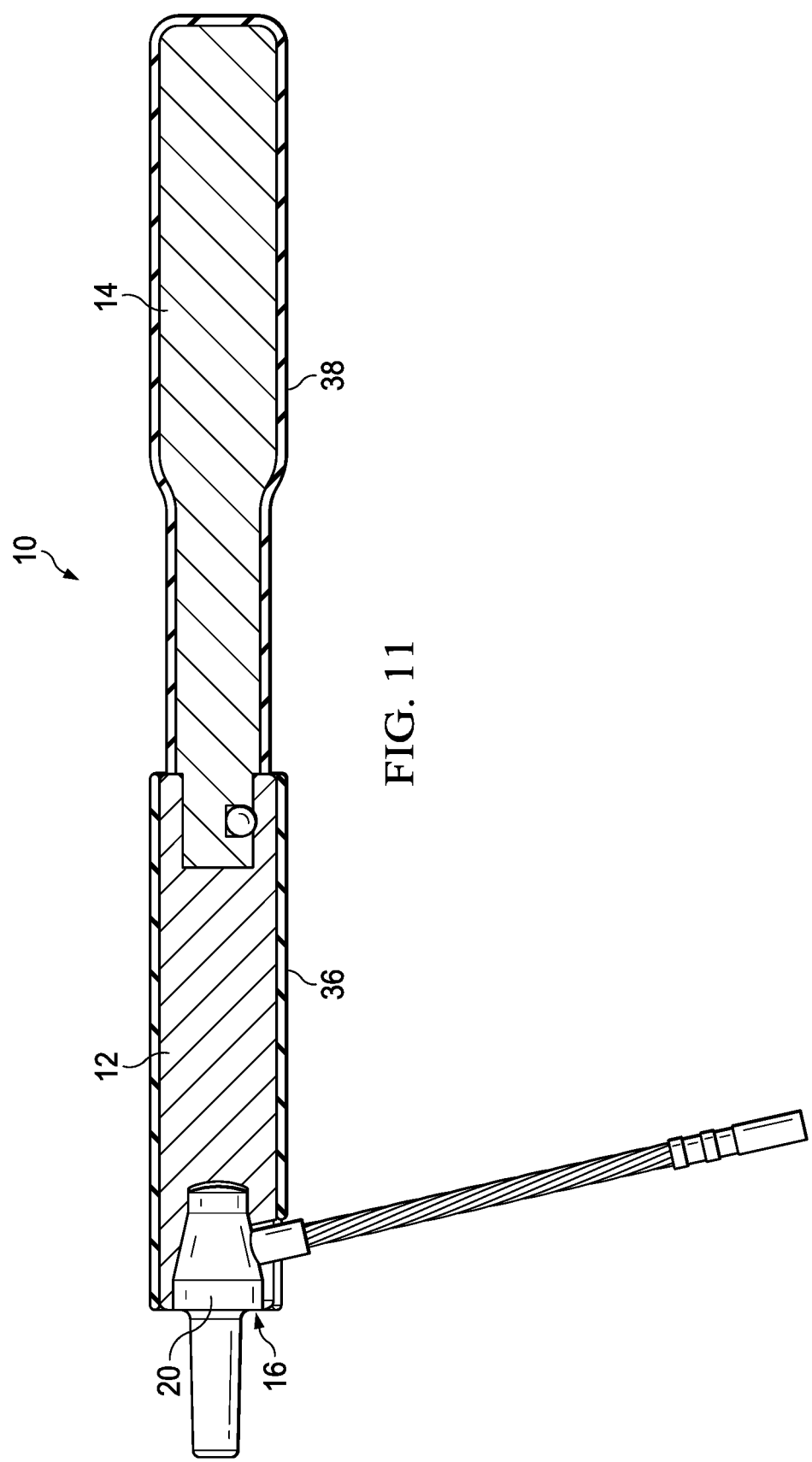
FIG. 11 is a side cross section view of the rail bond tool of FIG. 1, showing a portion of the rail bond of FIGS. 9A and 9B within the socket of the rail bond tool and ready for installation and/or removal of the rail bond to or from a rail.
Figure 12A:
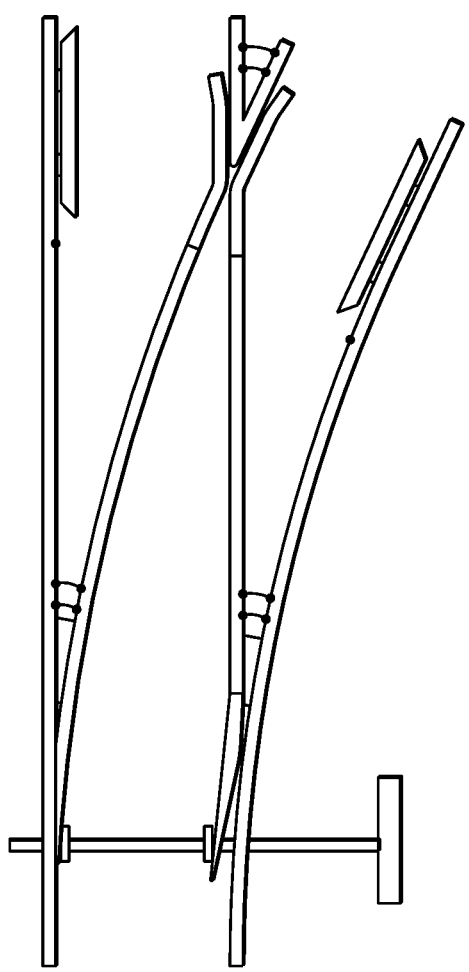
FIG. 12A is a schematic representation of a track turnout.
Figure 12B:
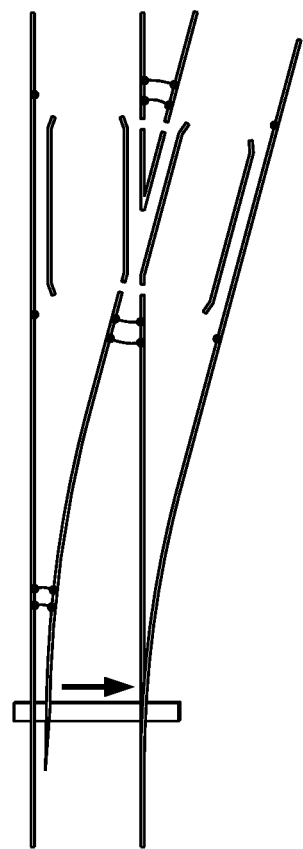
FIG. 12B is a schematic representation of a track crossing.
Figure 12C:
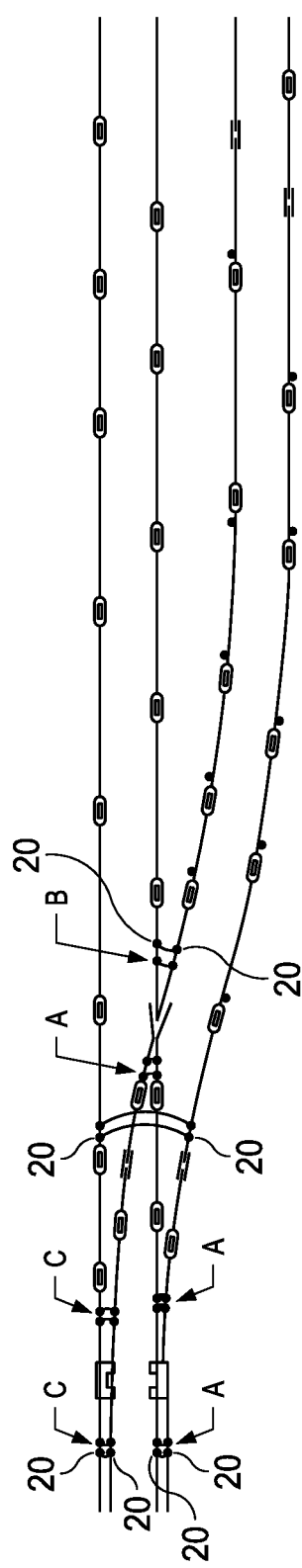
FIG. 12C is a schematic representation of a track turnout showing typical locations of rail bonds.
Figure 12D:
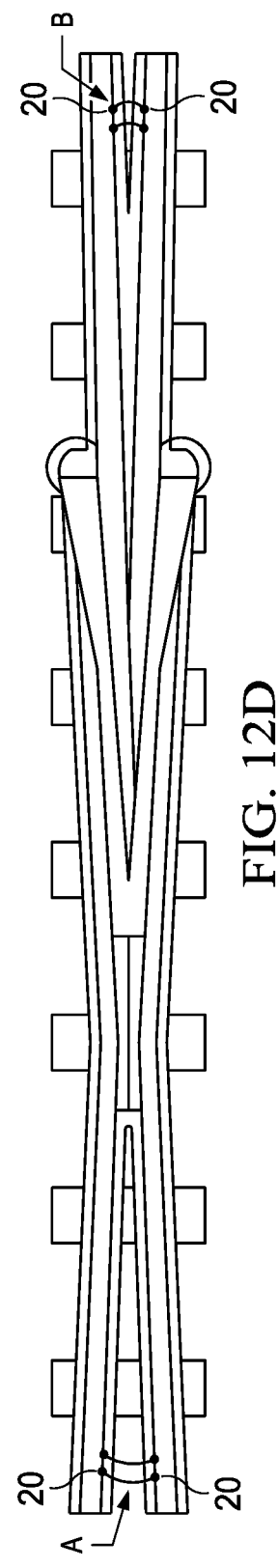
FIG. 12D is a schematic representation of a frog rail showing typical locations of rail bonds.

FIGS. 10 and 11 shows a portion of the rail bond 20 within the socket 16 of the socket body 12 of the rail bond tool 10 and ready for installation and/or removal of the rail bond 20 to or from the web 32 of the track rail 34.

The rail bond 20 is typically driven into and mounted to the web 32 of the track rail 34 by hammering the head 22 of the rail bond 20, so that the shank 24, which is typically tapered, is driven into a hole 35 in the web 32 of the track rail 34, the rail bond 20 being shown mounted to the web 32 of the track rail 34 in FIG. 9C. The end terminal 30 may be connected to another location in a rail circuit, as shown in FIGS. 12A-12D to complete a circuit between the web 32 of the track rail 34 and the other location.

The socket 16 of the socket body 12 of the rail bond tool 10 is adapted to removably and matingly fit about the head 22 of the rail bond 20 and over the head terminal 26.

The socket body 12 of the rail bond tool 10 has an insulated socket body covering 36, and the handle 14 of the rail bond tool 10 has an insulated handle covering 38, each to minimize electrical shock hazard and improve grip of the tool, while performing work on the rail bond 20, the web 32, or the track rail 34.

The head 22 of the rail bond 20 is substantially bell shaped and comprises an upper cylindrical portion 40, an intermediate frustoconical portion 42, a lower cylindrical portion 44 having a larger diameter than the upper cylindrical portion 40, the upper cylindrical portion 40 opposing the lower cylindrical portion 44, the intermediate frustoconical portion 42 therebetween, and a convex or dome shaped top portion 46 atop the upper cylindrical portion 40. The head terminal 26, which is typically cylindrical, is adjoined to an intermediate portion of the frustoconical portion 42 of the head 22 of the rail bond 20.

The socket 16 of the socket body 12 is adapted to removably and matingly fit about the head 22 of the rail bond 20 at a distal end 48 of the socket body 12. The socket 16 is substantially bell shaped and comprises an interior upper cylindrical wall portion 50, an interior intermediate frustoconical wall portion 52, an interior lower cylindrical wall portion 54 having a larger diameter than the interior upper cylindrical interior wall portion 50, the interior upper cylindrical wall portion 50 opposing the interior lower cylindrical wall portion 54, the interior intermediate frustoconical wall portion 52 therebetween and connected to each, and an interior convex or dome shaped roof portion 56 atop the interior upper cylindrical interior wall portion 50. The socket body 12 has a slot 58 between exterior wall 60 of the socket body 12 and the interior intermediate frustoconical wall portion 52 and the interior lower cylindrical wall portion 54 of the socket 16, which is adapted to removably fit over the head terminal 26 of the head 22 of the rail bond 20.

The socket body 12 and the handle 14 are preferably of steel or other suitable material. The insulated socket body covering 36 and the insulated handle covering 38 are preferably of neoprene rubber or other suitable material, each to minimize electrical shock hazard and improve grip of the tool, while performing work on the rail bond 20, the web 32, or the track rail 34. The insulated socket body covering 36 and the insulated handle covering 38 may be discrete components, or the socket body 12 and/or the handle 14 may be coated with a suitable insulating material.

Figure 8A:
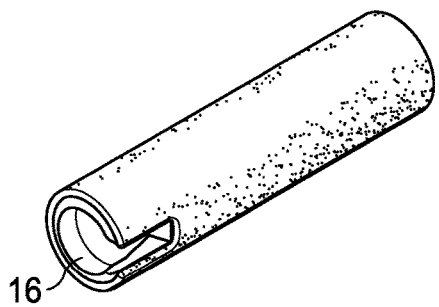
FIG. 8A is a perspective view of the socket of the rail bond tool of FIG. 1.
Figure 8B:
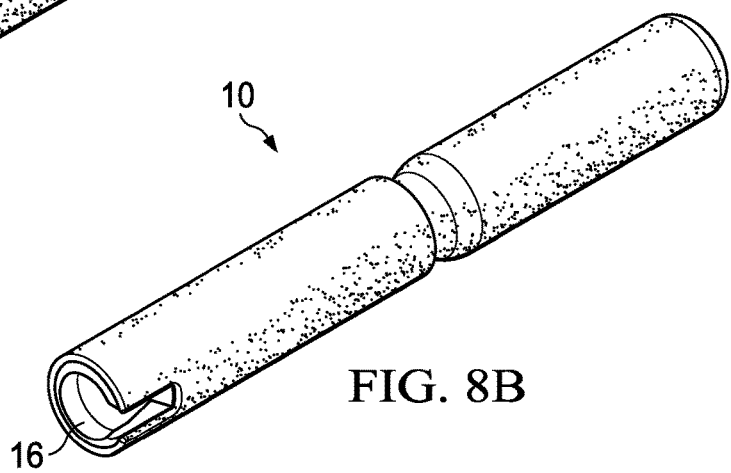
FIG. 8B is a perspective view of the rail bond tool of FIG. 1, showing the socket and a handle of the rail bond tool.
Figure 8C:
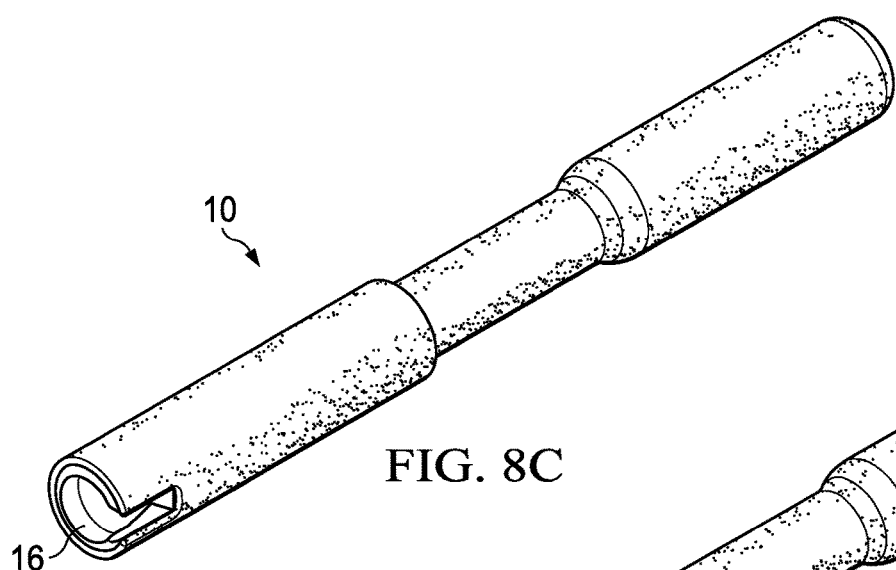
FIG. 8C is a perspective view of the rail bond tool of FIG. 1, showing the socket and another handle of the rail bond tool.
Figure 8D:
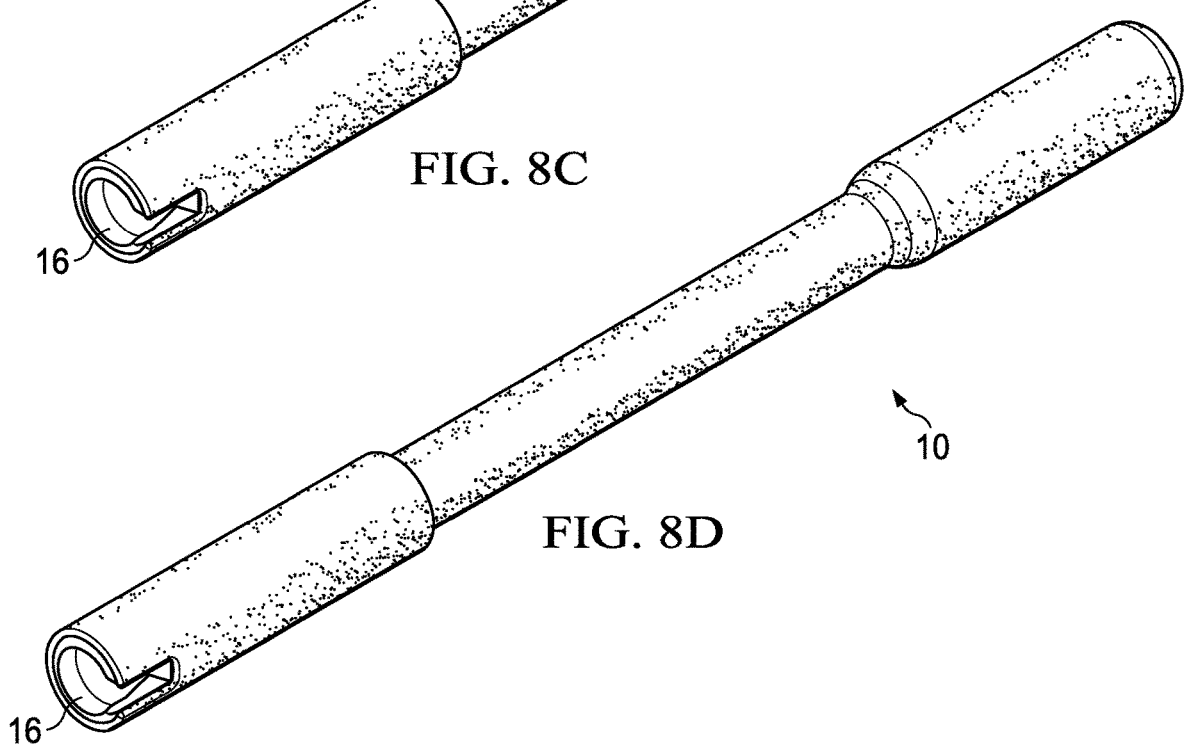
FIG. 8D is a perspective view of the rail bond tool of FIG. 1, showing the socket and yet another handle of the rail bond tool.

The rail bond tool 10 may be constructed as a kit for use in the field, which may be used with the socket body alone, as shown in FIG. 8A, without the handle 14 or with any of the different length handles 14, as shown in FIGS. 8B-8D, depending on the space available between the web 32 of the track rail 34 where the rail bond 20 is to be installed or removed and other obstructions that might otherwise impede installation and/or removal of the rail bond 20. The handle 14 of FIG. 9D may optionally be a breaker bar.

FIGS. 12A-12D show rail bonds and circuits typically used in track turnouts and track crossings.

Figure 13A:
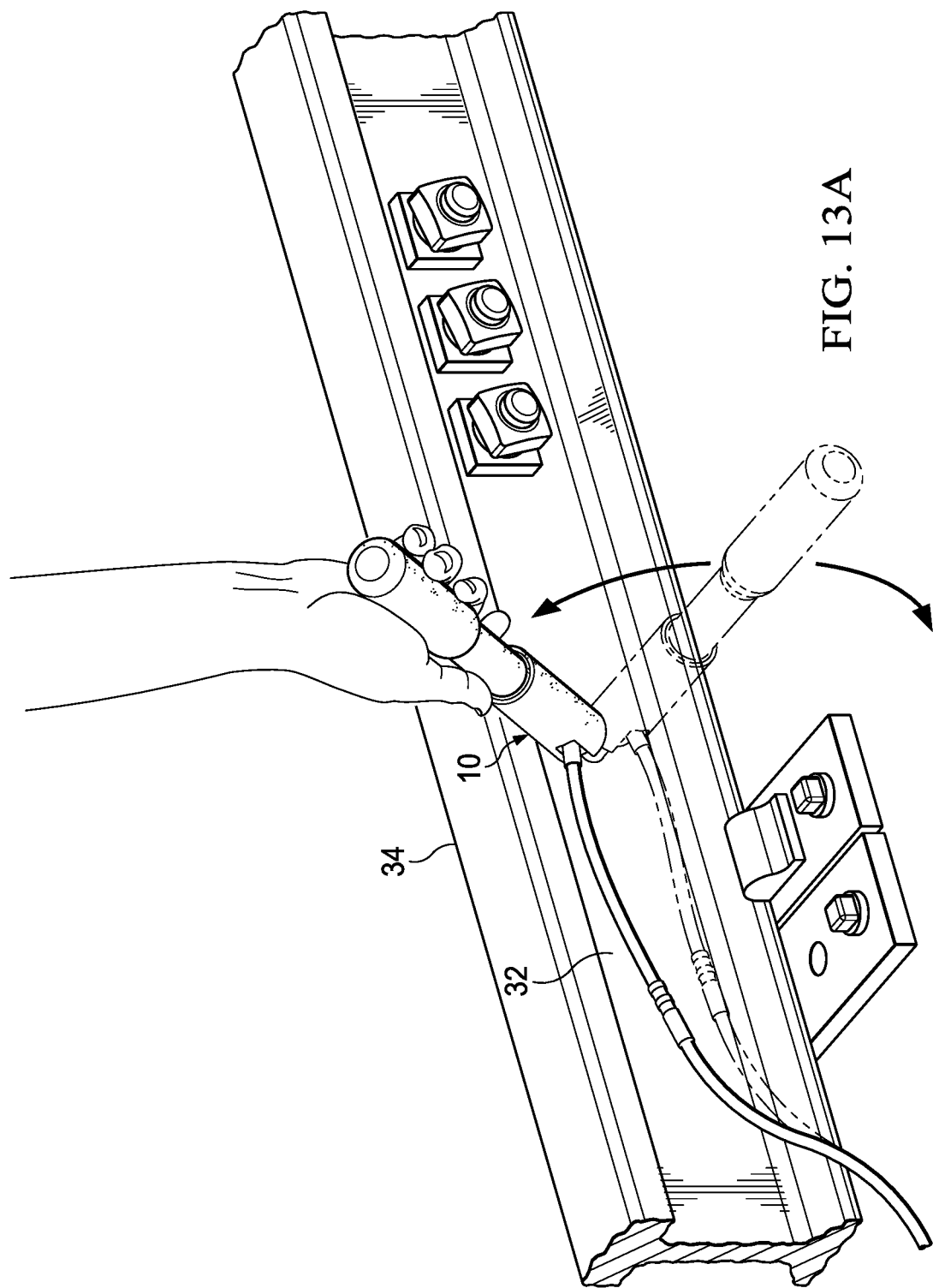
FIG. 13A is a schematic representation of the rail bond tool of FIG. 1, during the initial stage of removal of a rail bond from a rail.
Figure 13B:
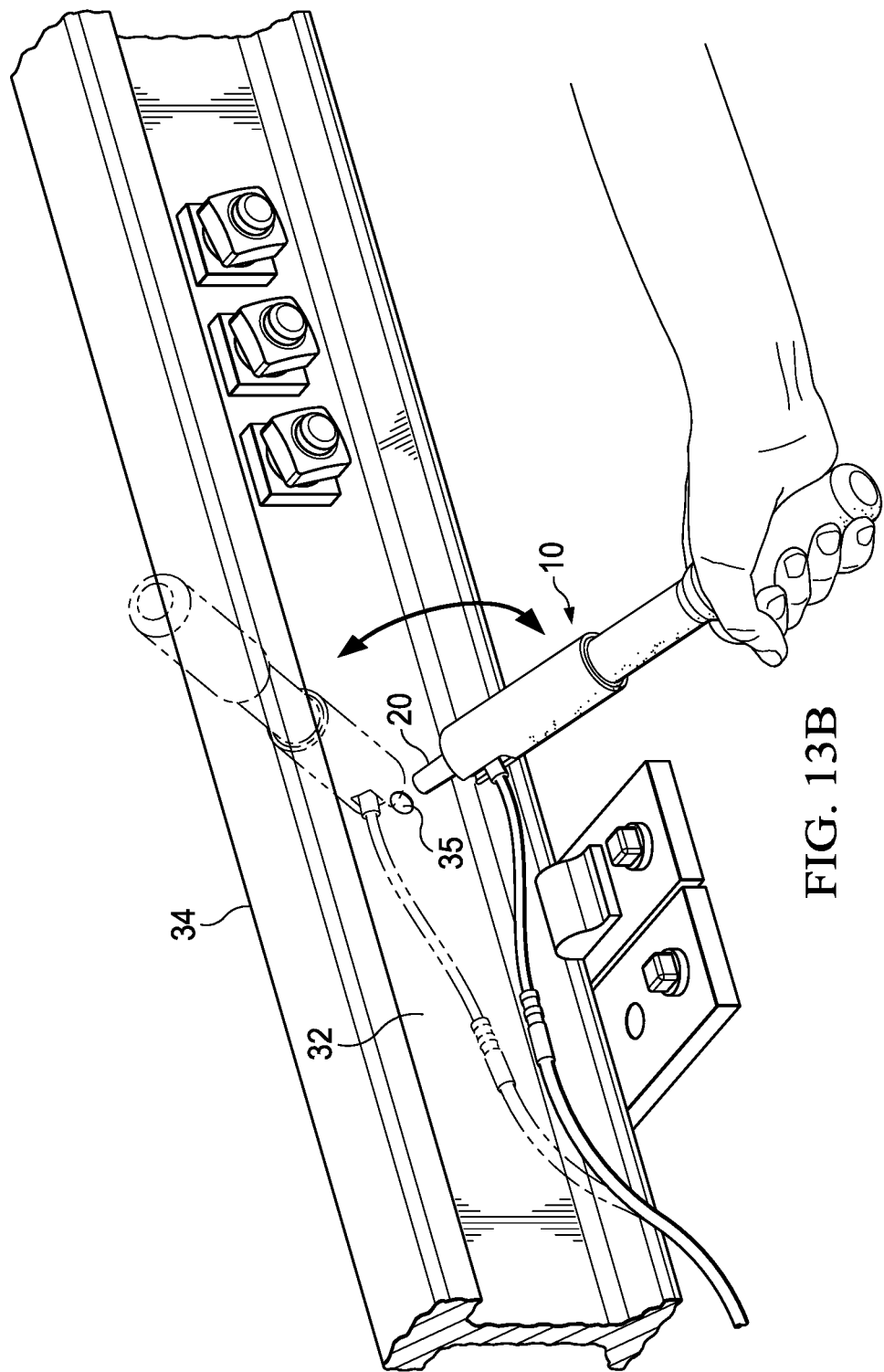
FIG. 13B is a schematic representation of the rail bond tool of FIG. 1, during the final stage of removal of the rail bond from the rail.

FIGS. 13A and 13B show the rail bond tool 10 during the initial and final stages of removal of the rail bond 20 from the web 32 of the track rail 34.

Figure 14A:
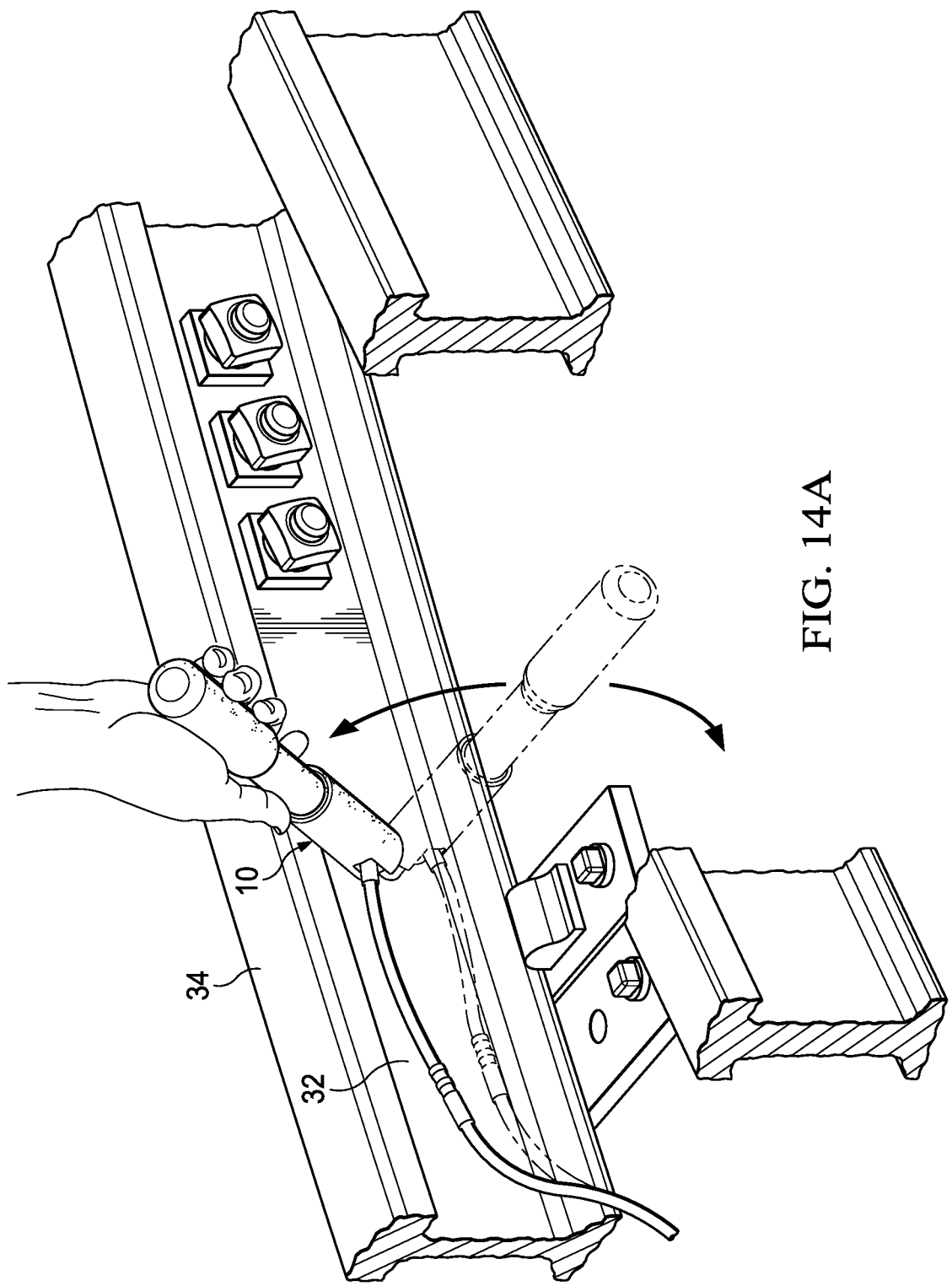
FIG. 14A is a schematic representation of the rail bond tool of FIG. 1, during the initial stage of removal of a rail bond from a rail at a track turnout, crossover, or frog.
Figure 14B:
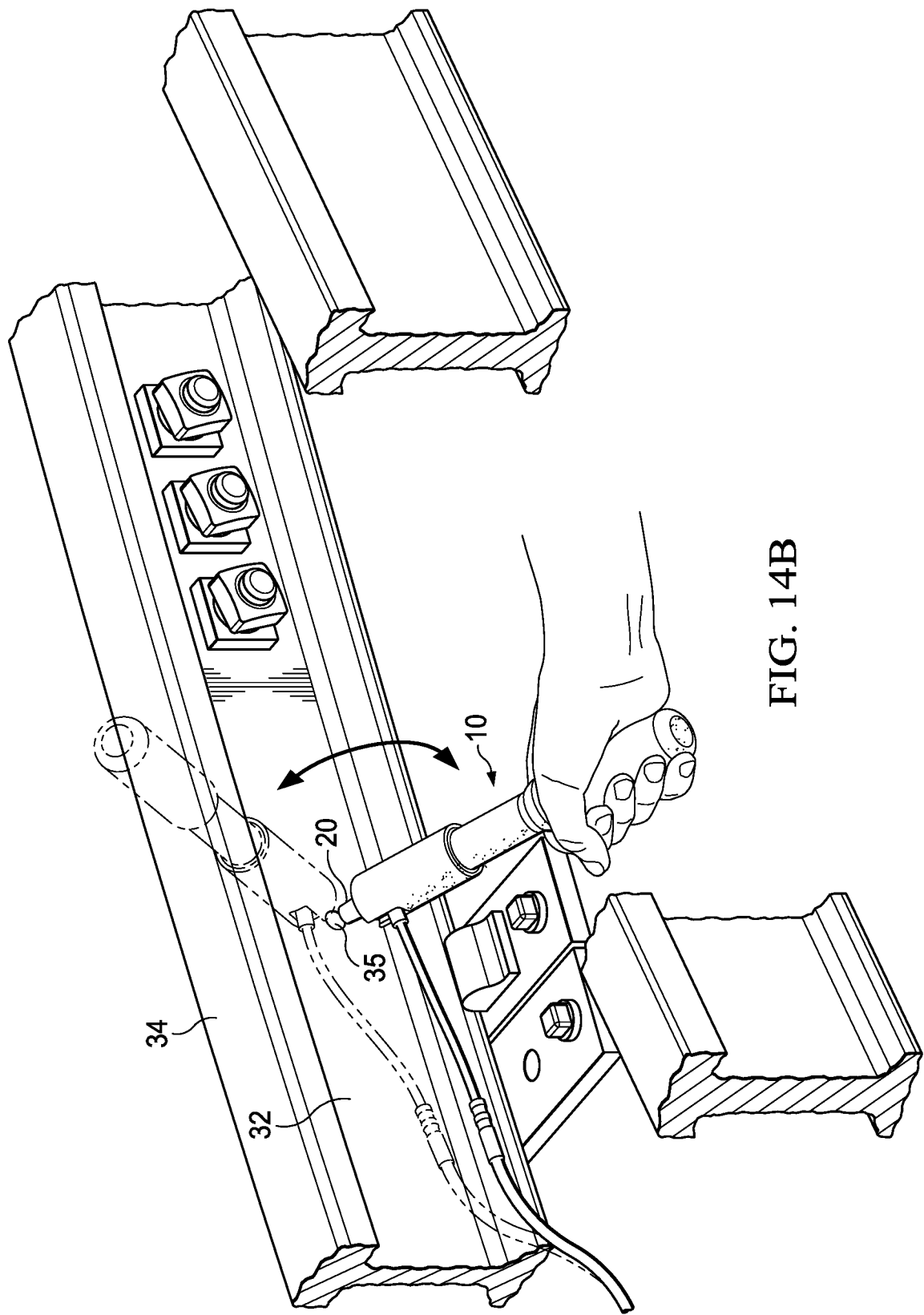
FIG. 14B is a schematic representation of the rail bond tool of FIG. 1, during the final stage of removal of the rail bond from the rail at the track turnout, crossover, or frog.

FIGS. 14A and 14B show the rail bond tool 10 during the initial and final stages of removal of the rail bond 20 from the web 32 of the track rail 34 at the track turnout, crossover, or frog.

The rail bond 20 may be removed from the web 32 of the track rail 34 by matingly fitting the socket 16 of the rail bond tool 10 about the head 22 of the rail bond 20 and prying the rail bond 20 from the hole 35 in the web 32 of the track rail 34, as shown in FIGS. 13A, 13B, 14A, and 14B, thus, prying the shank 24 of the rail bond 20 out of the hole 35 in the web 32 of the track rail 34, using the rail bond tool 10.

Use of the rail bond tool 20 simplifies and speeds up installation and removal of the rail bond 20 from the web 32 of the track rail 34 substantially.

It is obvious that use of a hammer or lump hammer to hammer the rail bond 20 out of the web 32 of the track rail 34, which is the prior art method of removal of the rail bond 20 from the web 32 of the track rail 34 at the track turnout, crossover, or frog is difficult, because of the close proximity of the webs 32 of the track rails 34 to one another.

Use of the rail bond tool 10 to remove the rail bond 20 from the web 32 of the track rail 34, on the other hand, simplifies and speeds up removal of the rail bond 20 from the web 32 of the track rail 34 substantially.

The rail bond tool 10 may be used to install the rail bond 20 and fasten the rail bond 20 to the web 32 of the track rail 34 by matingly fitting the socket 16 of the rail bond tool 10 about the head 22 of the rail bond 20 and impacting the rail bond tool 10 to drive the shank 24 of the rail bond 20 into the hole 35 in the web 32 of the track rail 34, thus, fastening the rail bond 20 to the web 32 of the track rail 34.

Figure 15:
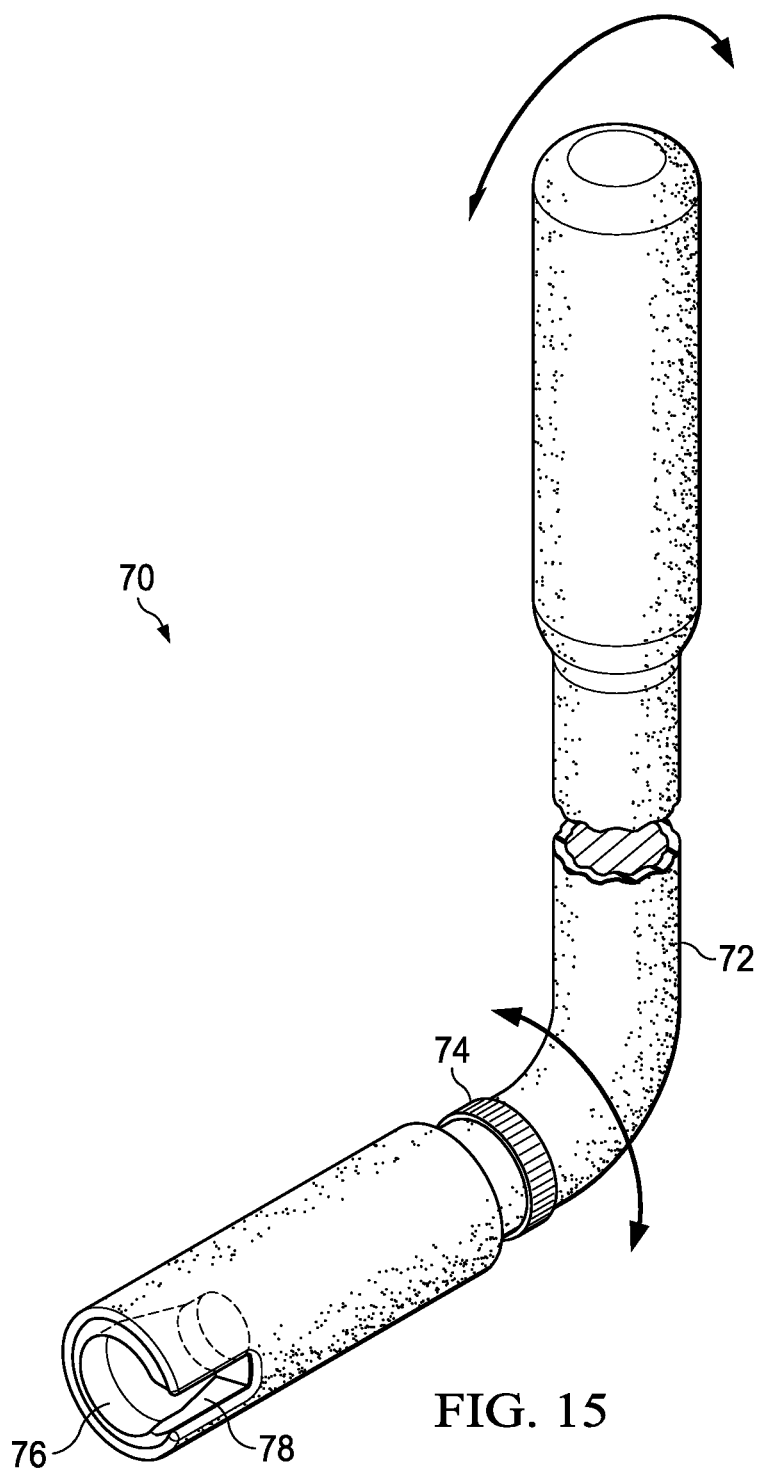
FIG. 15 is a perspective view of another rail bond tool, constructed in accordance with the present invention.
Figure 17:
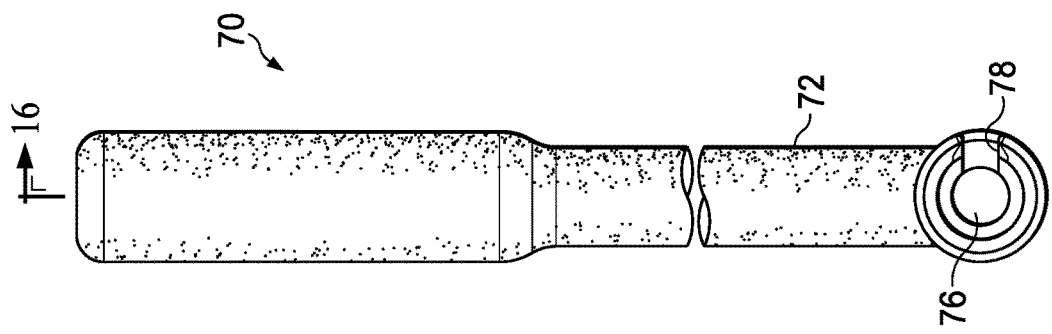
FIG. 17 is a front view of the rail bond tool of FIG. 15.
Figure 16:
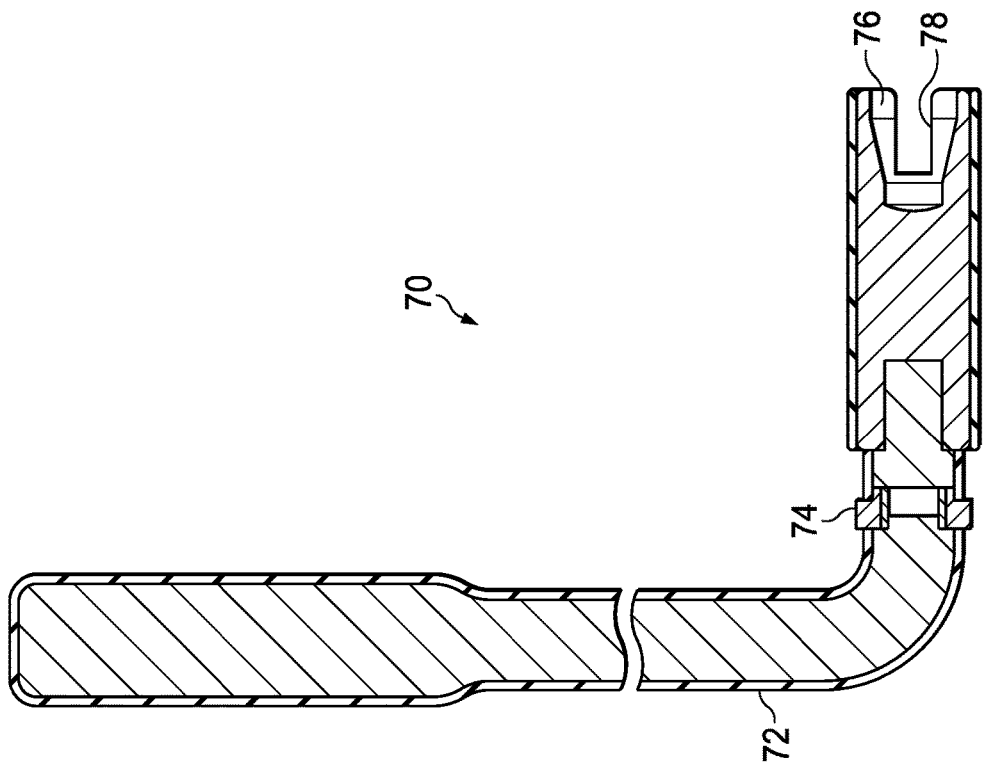
FIG. 16 is a side cross section of the rail bond tool of FIG. 15.

FIGS. 15-17 show an alternate embodiment of a rail bond tool 70, which is substantially the same as the rail bond tool 10, except that the rail bond tool 70 has a substantially L shaped handle 72, which facilitates use of the rail bond tool 70 in tight spaces. The substantially L shaped handle 72 has a friction lock 74, which may be unlocked to allow rotation of socket 76 about the rail bond 20 to align slot 78 of the rail bond tool 70 with the head terminal 26 of the head 22 of the rail bond 20. Once the slot 78 of the rail bond tool 70 is aligned with the head terminal 26 of the head 22 of the rail bond 20 and the socket 76 of the rail bond tool 70 is matingly fit about the head 22 of the rail bond 20 and over the head terminal 26, the friction lock 74 may be locked to prevent further rotation of the socket 76 and allow the rail bond 20 to be removed from the web 32 of the track rail 34.

Figure 18:
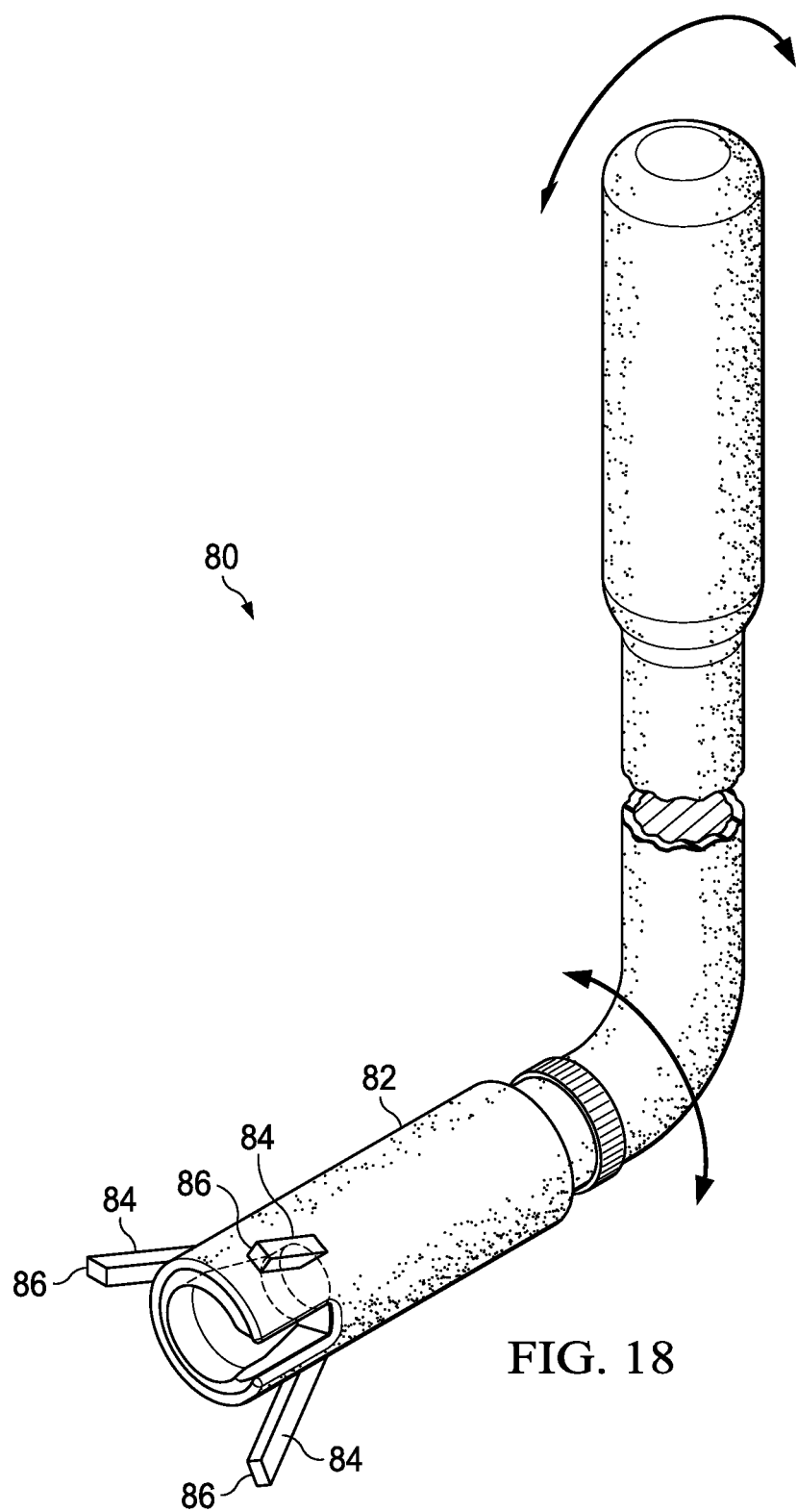
FIG. 18 is a perspective view of another rail bond tool, constructed in accordance with the present invention.

FIGS. 18-20 show an alternate embodiment of a rail bond tool 80, which is substantially the same as the rail bond tool 70, except that the rail bond tool 80 has a socket body 82 having three substantially equally spaced legs 84 about the socket body 82, which form a tripod about the socket body 82 and facilitate ends 86 of the legs 84 to bite into to the web 32 of the track rail 34 and further facilitate prying the rail bond 20 from the web 32 of the track rail 34. The rail bond tool 80 may have another suitable number of legs and/or leg spacing.

Figure 21:
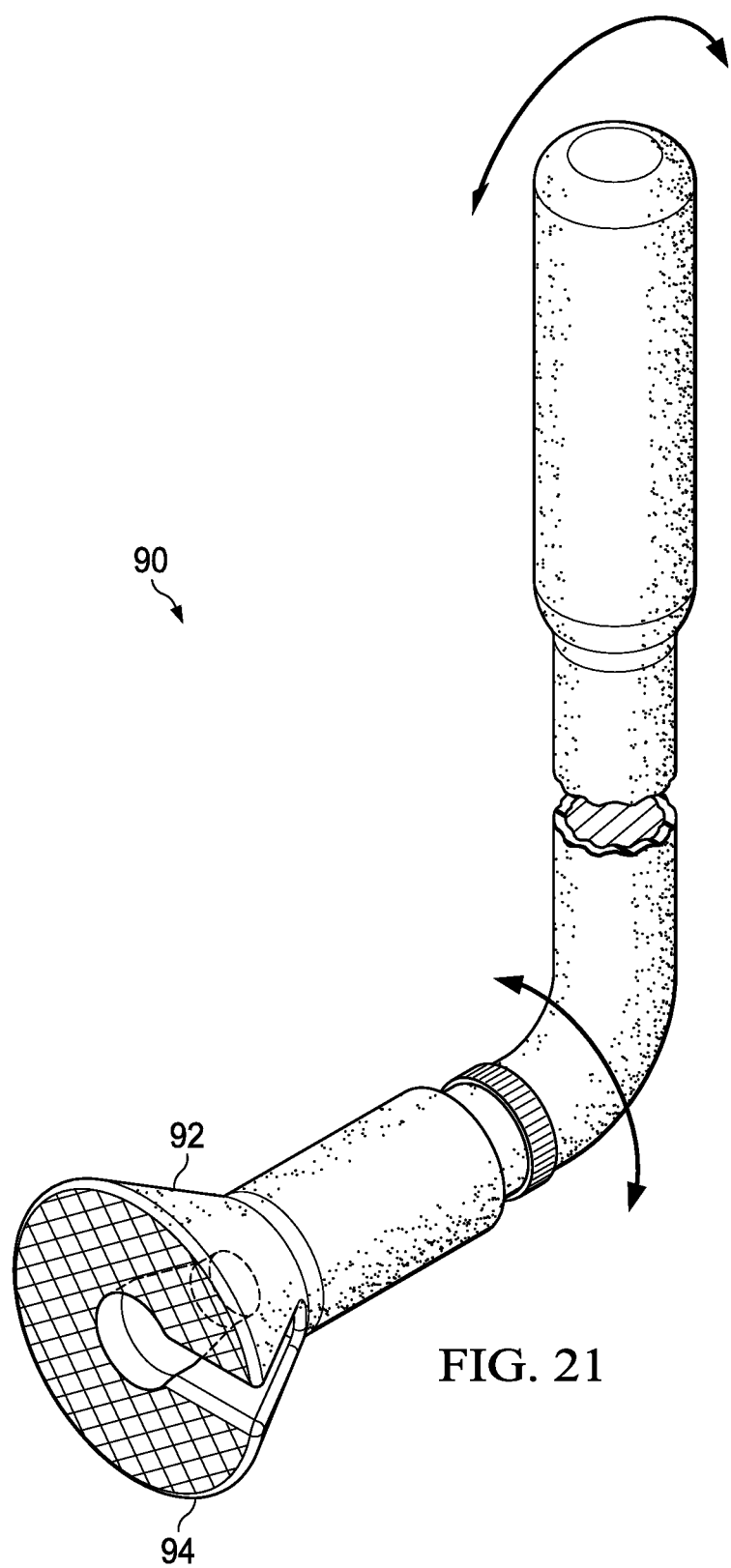
FIG. 21 is a perspective view of another rail bond tool, constructed in accordance with the present invention.
Figure 23:
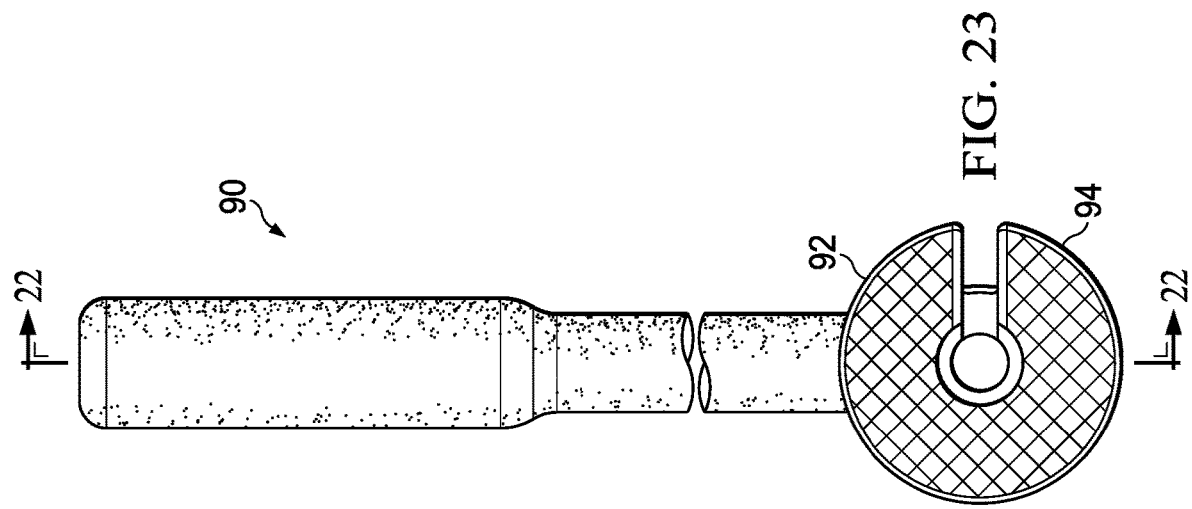
FIG. 23 is a front view of the rail bond tool of FIG. 21.
Figure 22:
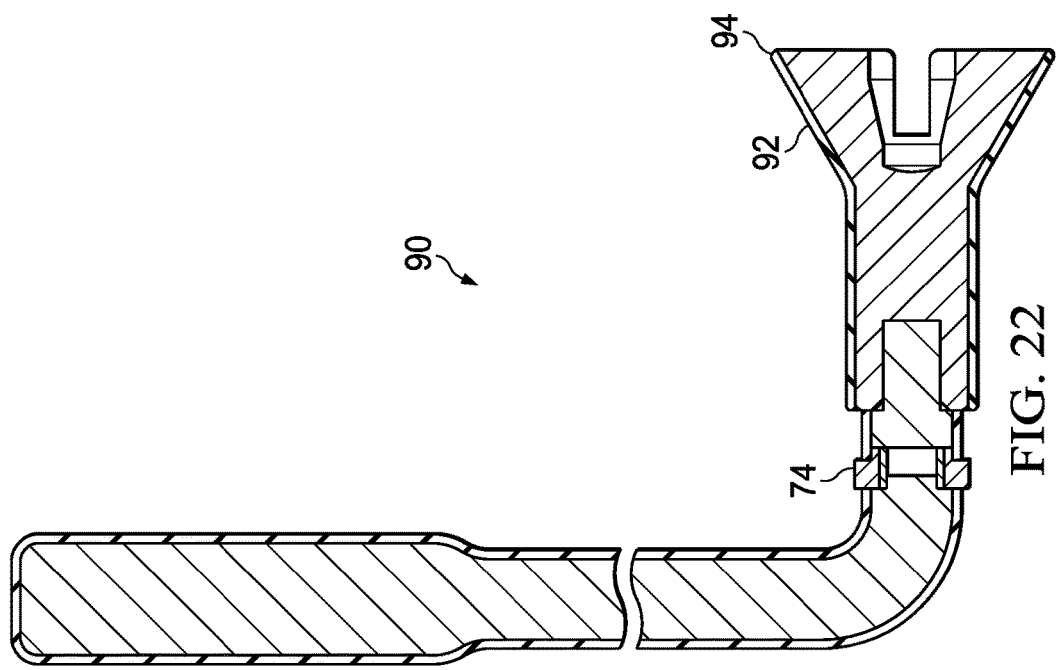
FIG. 22 is a side cross section of the rail bond tool of FIG. 21.

FIGS. 21-23 show an alternate embodiment of a rail bond tool 90, which is substantially the same as the rail bond tool 70, except that the rail bond tool 90 has a flared horn shaped socket body 92 having edge 94, which facilitates the edge 94 to bite into to the web 32 of the track rail 34 and further facilitate prying the rail bond 20 from the web 32 of the track rail 34.

Figure 24A:
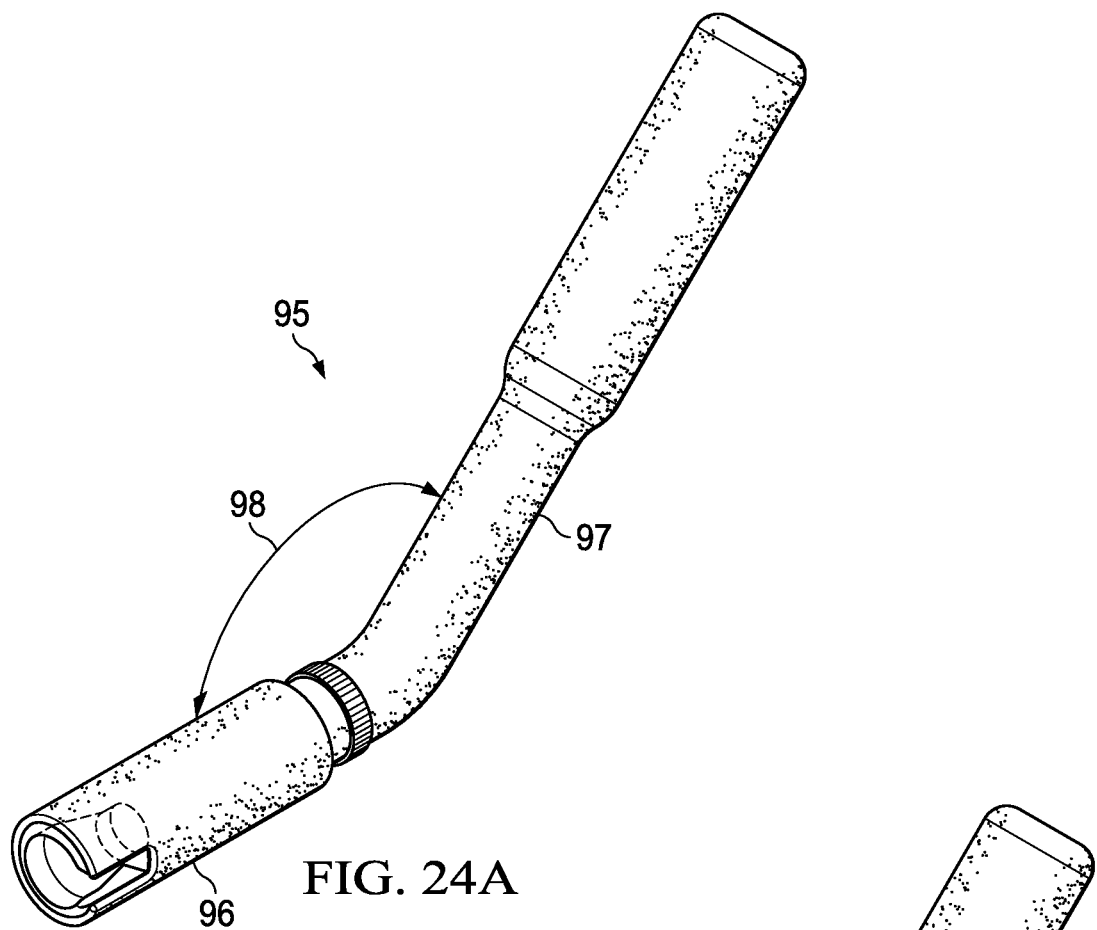
FIG. 24A is a perspective view of another rail bond tool, constructed in accordance with the present invention.

FIG. 24A shows an alternate embodiment of a rail bond tool 95, which is substantially the same as the rail bond tool 70, except that the rail bond tool 95 has a socket body 96 and a bent handle 97, having an obtuse angle 98 at elbow 99, which facilitates use of the rail bond tool 95 in tight spaces. Although the obtuse angle 98 is shown in FIG. 24 as one hundred thirty five degrees, the obtuse angle 98 may be any suitable angle between ninety degrees and one hundred eighty degrees.

Figure 24B:
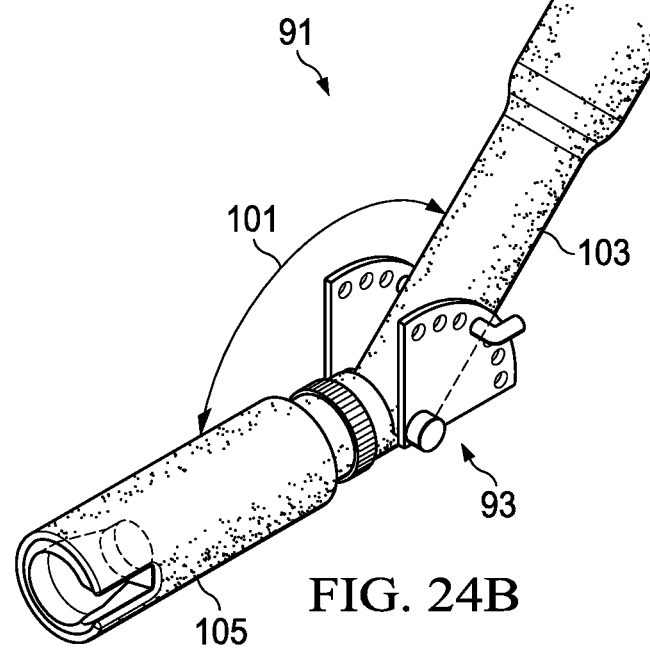
FIG. 24B is a perspective view of another rail bond tool, constructed in accordance with the present invention.

FIG. 24B shows an alternate embodiment of a rail bond tool 91, which is substantially the same as the rail bond tool 95, except that the rail bond tool 91 has a locking angle adjuster 93 that facilitates adjusting angle 101 between handle 103 and socket body 105 and may be used to lock the angle 101 between the handle 103 and the socket body 105

Figure 25:
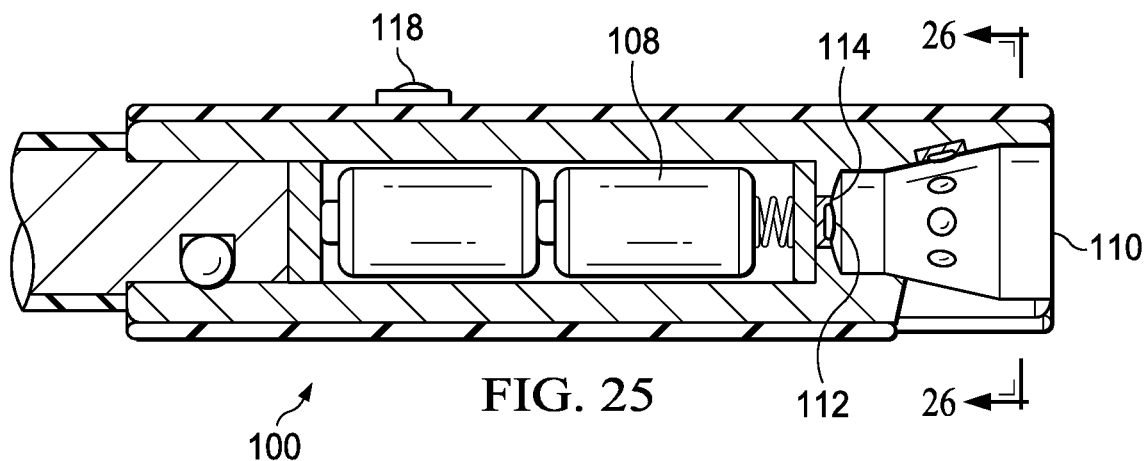
FIG. 25 is a perspective view of another rail bond tool, constructed in accordance with the present invention.
Figure 26:
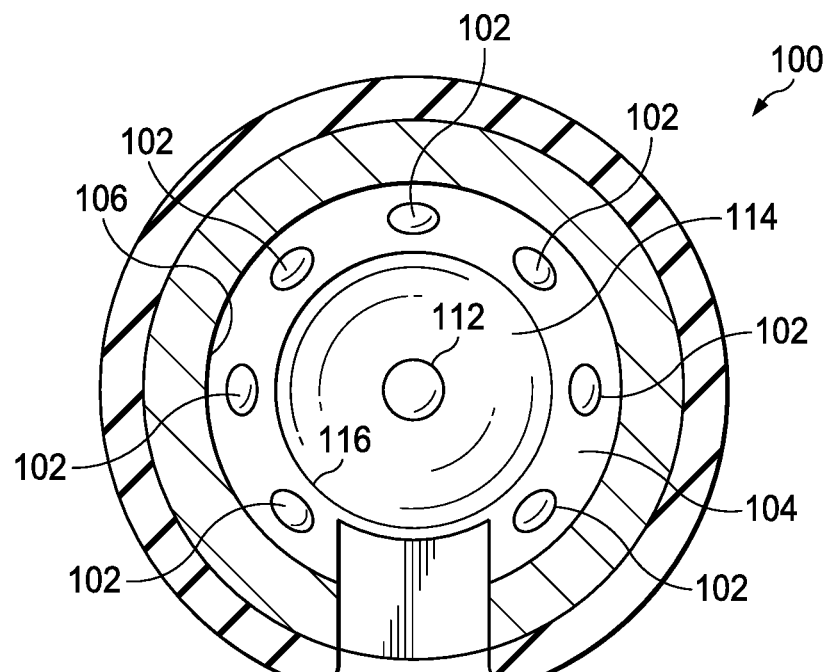
FIG. 26 is an end cross section view of a socket of the rail bond tool of FIG. 25.

FIGS. 25 and 26 show an alternate embodiment of a rail bond tool 100, which is substantially the same as the rail bond tool 10, except that the rail bond tool 100 has a plurality of substantially equally spaced LED light bulbs 102 mounted in intermediate frustoconical portion 104 of socket 106 and a built in power supply 108 to supply power to the plurality of LED light bulbs 102. Light from the LED light bulbs 102 is directed toward distal end 110 of the socket 106 and out of the socket 106 to illuminate the rail bond 20 and facilitate guiding the socket 106 of the rail bond tool 100 about the head terminal 26 and the head 22 of the rail bond 20 on the web 32 of the track rail 34 and further facilitate removal and/or installation of the rail bond 20 on the web 32 of the track rail 34, especially in dimly lit or low light conditions, such as in subways, rail tunnels, and night time. Optional substantially centrally disposed LED light bulb 112 at convex or dome shaped top interior roof portion 114 atop upper cylindrical interior wall portion 116 may be used for additional light. Switch 118 is used to switch power on or off to the plurality of LED light bulbs 102 or the optional substantially centrally disposed LED light bulb 112, or combination thereof.

Figure 27:
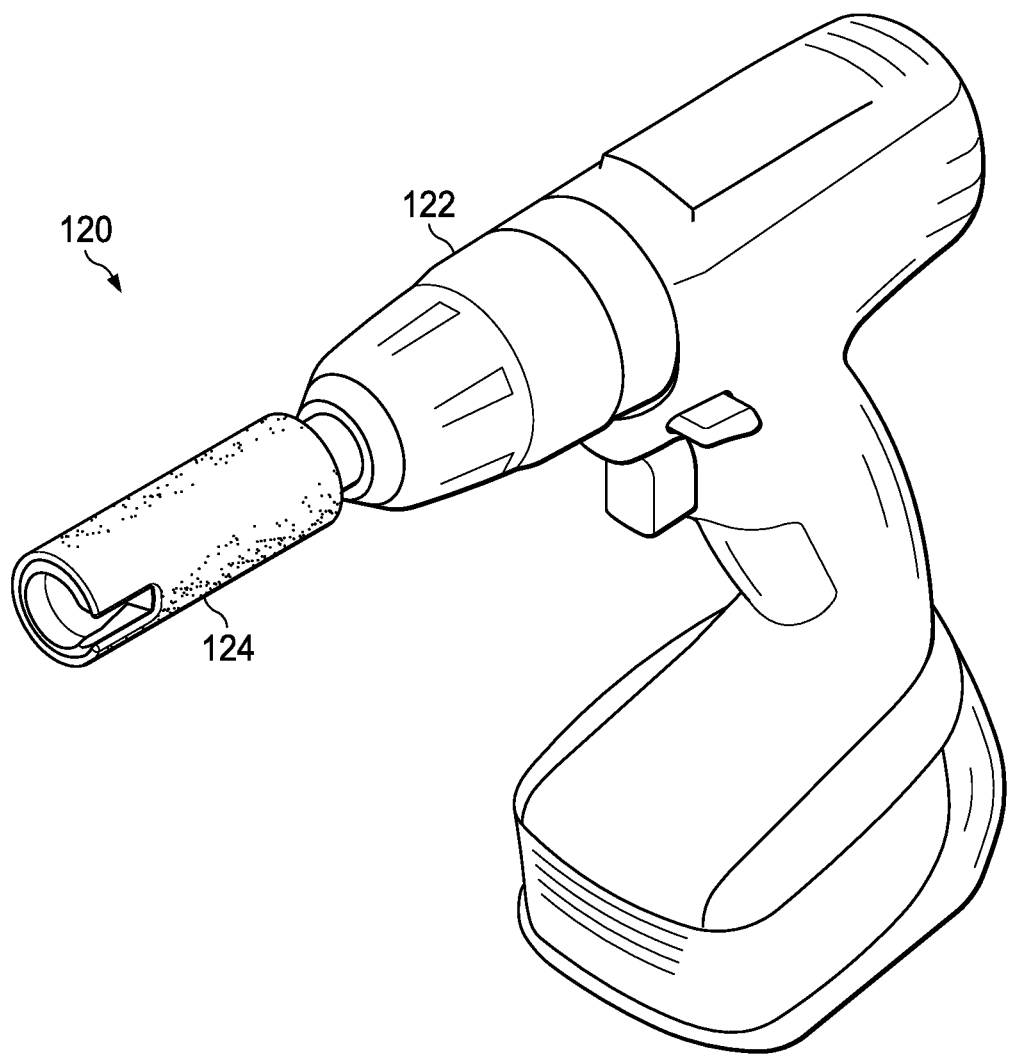
FIG. 27 is a perspective view of a power driven rail bond tool.

FIG. 27 shows an alternate embodiment of a rail bond tool 120, which is substantially the same as the rail bond tool 10, except that the rail bond tool 120 has a power impact tool 122 removably and matingly fastened to socket body 124 facilitate installation and/or removal of the rail bond 20 to or from the web 32 of the track rail 34.

Figure 28:
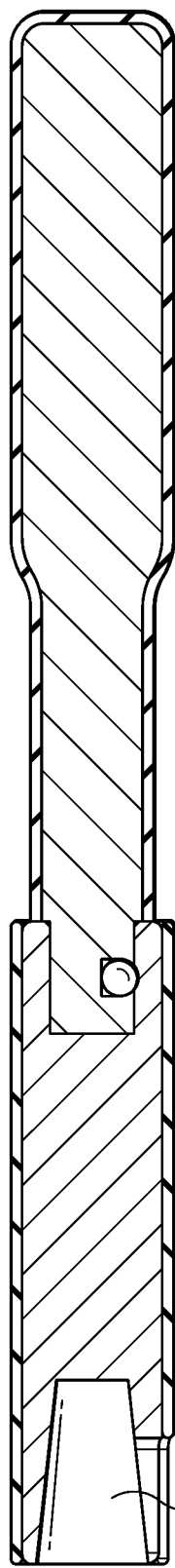
FIG. 28 is a side cross section view of yet another rail bond tool, constructed in accordance with the present invention.
Figure 29:
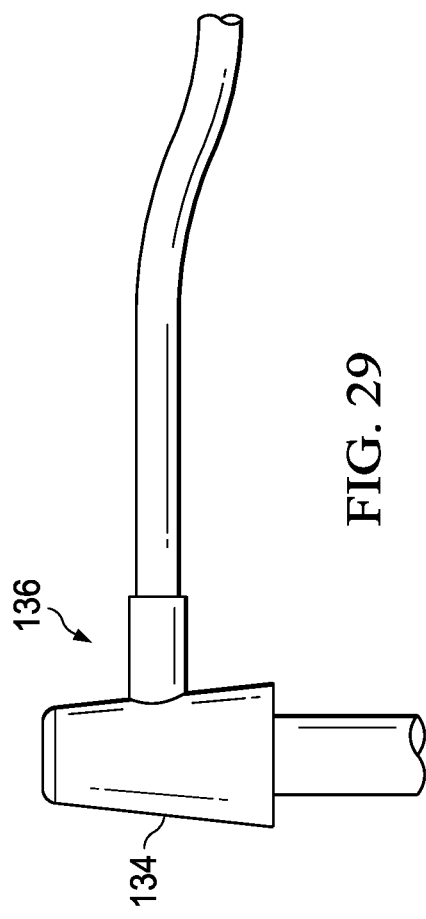
FIG. 29 is a side view of another rail bond.
Figure 30:
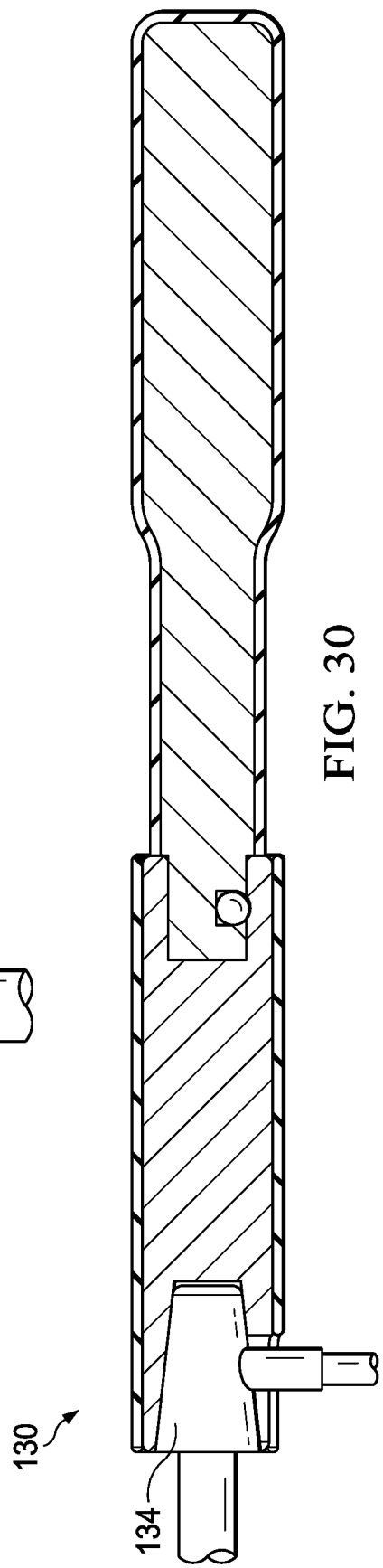
FIG. 30 is a side cross section view of the rail bond tool of FIG. 28, showing a portion of the rail bond of FIG. 29 within a socket of the rail bond tool and ready for installation and/or removal of the rail bond from a rail.

FIG. 28 shows an alternate embodiment of a rail bond tool 130, which is substantially the same as the rail bond tool 10, except that the rail bond tool 130 has a substantially frustoconical shaped socket 132, which is adapted to removably and matingly fit about a substantially frustoconical shaped head 134 of a rail bond 136, which is shown in FIG. 29. FIG. 30 shows the frustoconical shaped head 134 of the rail bond 136 within the substantially frustoconical shaped socket 132 of the rail bond tool 130 and ready for installation and/or removal of the rail bond 136 from the web 32 of the track rail 34.

Figure 31:
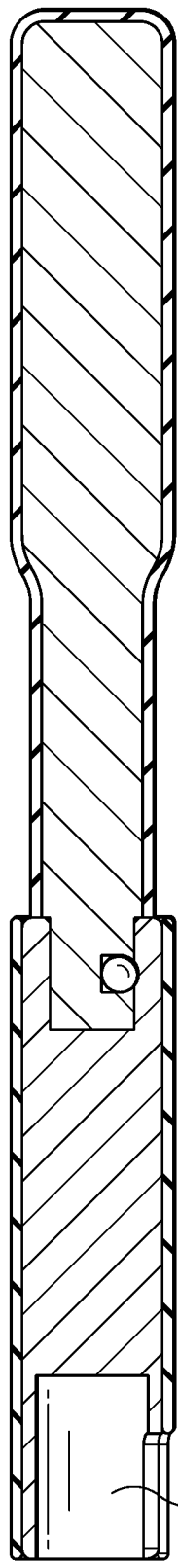
FIG. 31 is a side cross section view of yet another rail bond tool, constructed in accordance with the present invention.
Figure 32:
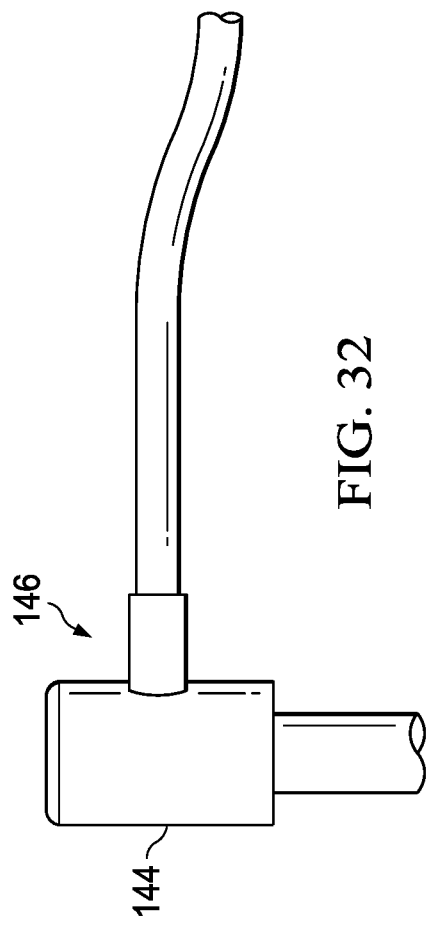
FIG. 32 is a side view of yet another rail bond.
Figure 33:
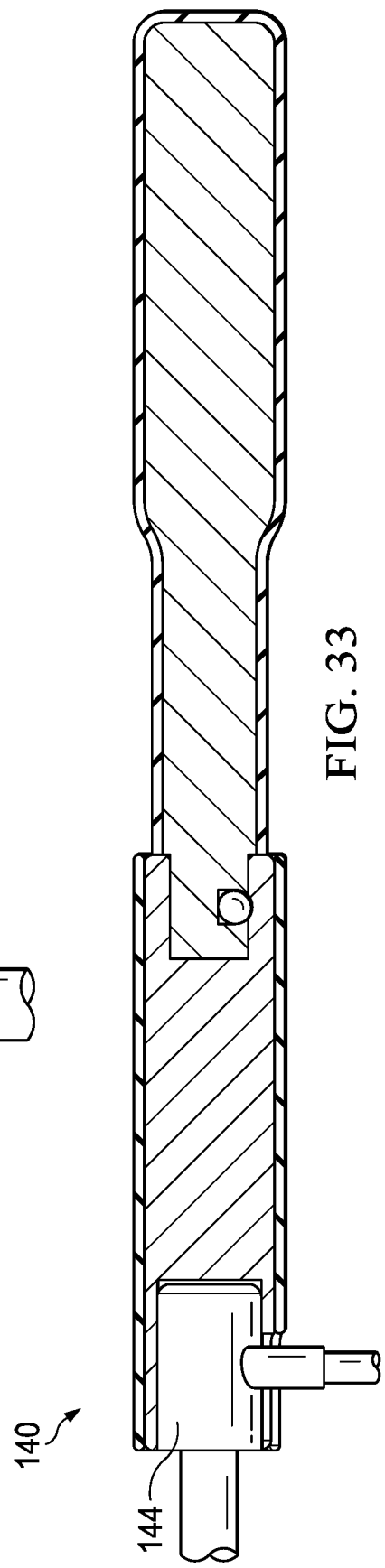
FIG. 33 is a side cross section view of the rail bond tool of FIG. 31, showing a portion of the rail bond of FIG. 32 within a socket of the rail bond tool and ready for installation and/or removal of the rail bond from a rail.

FIG. 31 shows an alternate embodiment of a rail bond tool 140, which is substantially the same as the rail bond tool 10, except that the rail bond tool 140 has a substantially cylindrical shaped socket 142, which is adapted to removably and matingly fit about a substantially cylindrical shaped head 144 of a rail bond 146, which is shown in FIG. 32. FIG. 33 shows the head 144 of the cylindrical shaped rail bond 146 within the substantially cylindrical shaped socket 142 of the rail bond tool 140 and ready for installation and/or removal of the rail bond 146 from the web 32 of the track rail 34.

Figure 34:
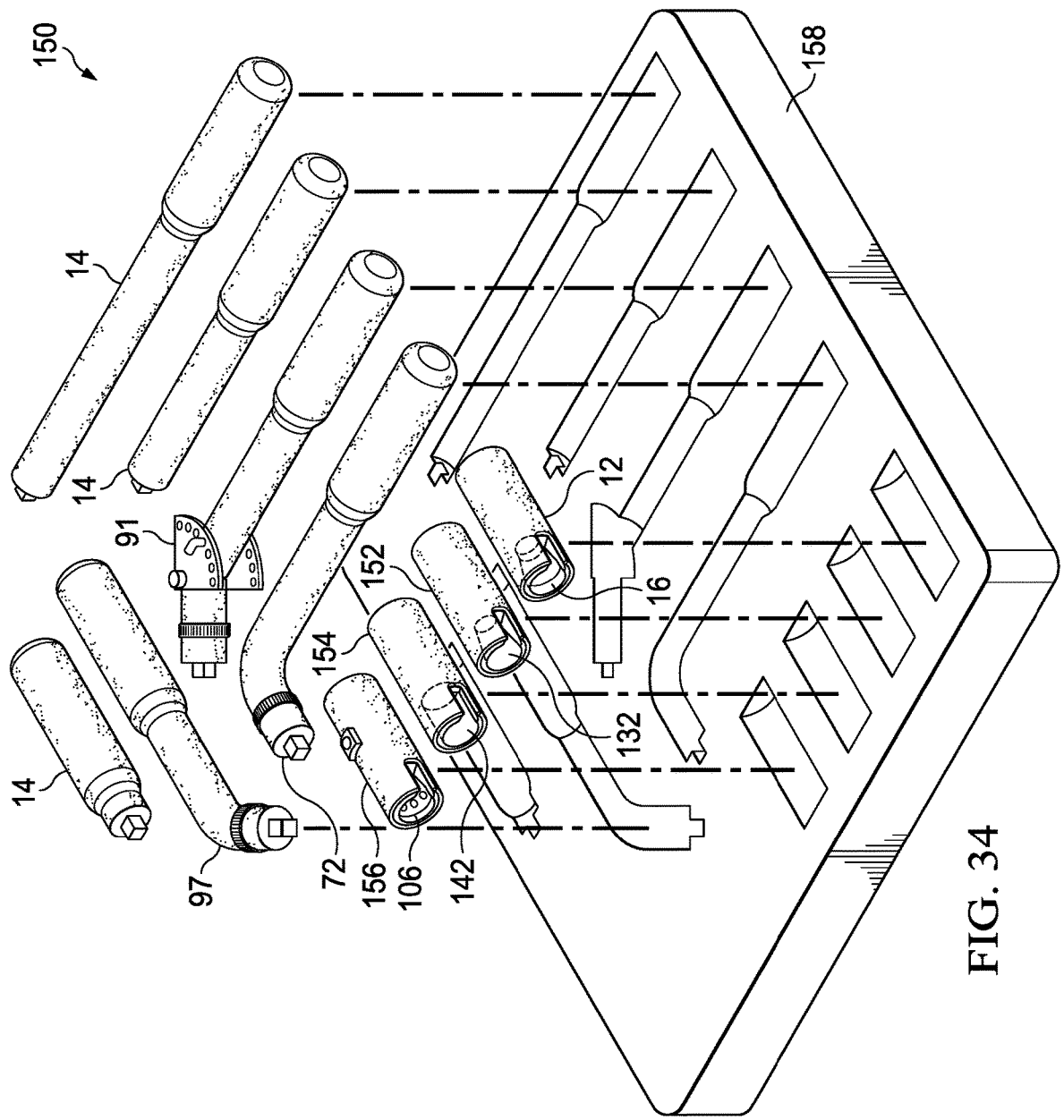
FIG. 34 is an exploded perspective view of a rail bond tool kit.

FIG. 34 is an exploded perspective view of a rail bond tool kit 150, which has a combination of rail bond tools of the present invention, constructed in accordance with the present invention, that may be used in a variety of situations. The rail bond tool kit 150 comprises handles 14, each having a different length, for use with socket bodies 12, 152, 154, and 156 having different sockets 16, 132, 142, and 106, respectively, substantially L shaped handle 72, bent handle 97, and angle adjuster handle 91, each removably and matingly mounted in holder 158. The sockets 16, 132, 142, and 106 include: a substantially bell shaped socket comprising an interior upper cylindrical interior wall portion, an interior intermediate frustoconical wall portion, and an interior lower cylindrical wall portion having a larger diameter than the interior upper cylindrical interior wall portion; a substantially frustoconical shaped socket; a substantially cylindrical shaped socket; and a socket having a plurality LED light bulbs within the socket for directing light out of the socket, respectively. Each of the sockets 16, 132, 142, and 106 of the socket bodies 12, 152, 154, and 156, respectively may be used with any of the handles 14, 72, 97, or 91.

Although the present invention has been described in considerable detail with reference to certain preferred versions thereof, other versions are possible. Therefore, the spirit and scope of the appended claims should not be limited to the description of the preferred versions contained herein.

What is claimed is:

1. A rail bond tool for installation and removal of a rail bond to and from a web of a track rail, the rail bond having a rail bond head having a rail bond upper cylindrical portion, a rail bond lower cylindrical portion having a larger diameter than the rail bond upper cylindrical portion, a rail bond frustoconical portion therebetween, a rail bond terminal connected thereto, and a rail bond shank connected to the bottom of the rail bond head, comprising:
    a socket adapted to removably and matingly receive the rail bond head, the socket having an interior having:
        a rail bond tool interior upper cylindrical wall portion,
        a rail bond tool interior lower cylindrical wall portion having a larger diameter than the rail bond tool interior upper cylindrical wall portion,
        a rail bond tool interior frustoconical wall portion therebetween,
        an opening at a distal end of the socket adjacent the rail bond tool interior lower cylindrical wall portion having the same diameter as the rail bond tool interior lower cylindrical wall portion,
        the rail bond tool interior upper cylindrical wall portion, the rail bond tool interior frustoconical wall portion, and the rail bond tool interior lower cylindrical wall portion adapted to removably and matingly receive the rail bond head,
    a socket exterior wall portion, and
    a slot extending from the opening through the rail bond tool interior lower cylindrical wall portion and the rail bond tool interior frustoconical wall portion to the socket exterior wall portion,
        the slot adapted to removably receive the rail bond terminal.

2. The rail bond tool according to claim 1, further comprising:
    a handle connected to the socket.

3. The rail bond tool according to claim 1, further comprising:
    a straight handle removably connected to the socket.

4. The rail bond tool according to claim 1, further comprising:
    a bent handle removably connected to the socket.

5. The rail bond tool according to claim 4, wherein:
    the bent handle comprises a locking angle adjuster for adjusting the angle of the slot of the socket and a lock for locking the angle.

6. The rail bond tool according to claim 1, further comprising:
    an L shaped handle removably connected to the socket.

7. The rail bond tool according to claim 6, wherein:
the L shaped handle comprises a locking angle adjuster for adjusting the angle of the slot of the socket and a lock for locking the angle.

8. The rail bond tool according to claim 1, wherein:
the rail bond tool is insulated.

9. The rail bond tool according to claim 1, wherein:
the rail bond tool is configured to pry the rail bond from the web of the track rail.

10. A rail bond tool for installation and removal of a rail bond to and from a web of a track rail, the rail bond having a rail bond head having a rail bond frustoconical portion, a rail bond terminal connected thereto, and a rail bond shank connected to the bottom of the rail bond head, comprising:
a socket adapted to removably and matingly receive the rail bond head, the socket having an interior having:
a rail bond tool interior frustoconical wall portion,
an opening at a distal end of the socket having the same diameter as the rail bond tool interior frustoconical wall portion,
the rail bond tool interior frustoconical wall portion adapted to removably and matingly receive the rail bond head,
a socket exterior wall portion, and
a slot extending from the opening through the rail bond tool interior frustoconical wall portion to the socket exterior wall portion,
the slot adapted to removably receive the rail bond terminal.

11. The rail bond tool according to claim 10, further comprising:
a handle connected to the socket.

12. The rail bond tool according to claim 10, further comprising:
a straight handle removably connected to the socket.

13. The rail bond tool according to claim 10, further comprising:
a bent handle removably connected to the socket.

14. The rail bond tool according to claim 13, wherein:
the bent handle comprises a locking angle adjuster for adjusting the angle of the slot of the socket and a lock for locking the angle.

15. The rail bond tool according to claim 10, further comprising:
an L shaped handle removably connected to the socket.

16. The rail bond tool according to claim 10, wherein:
the rail bond tool is insulated.

17. The rail bond tool according to claim 10, wherein:
the rail bond tool is configured to pry the rail bond from the web of the track rail.

18. The rail bond tool according to claim 10, wherein:
the rail bond frustoconical portion has a rail bond upper smaller diameter portion and a rail bond lower larger diameter portion;
the rail bond further comprises:
a rail bond upper cylindrical portion adjoined to the rail bond upper smaller diameter portion,
a rail bond lower cylindrical wall portion, adjoined to the rail bond lower larger diameter wall portion.

19. A rail bond tool for installation and removal of a rail bond to and from a web of a track rail, the rail bond having a rail bond head having a rail bond frustoconical portion, a rail bond terminal connected thereto, and a rail bond shank connected to the bottom of the rail bond head, comprising:
a socket adapted to removably and matingly receive the rail bond head, the socket having:
a socket interior wall comprising:
an intermediate frustoconical interior wall portion having an upper smaller diameter wall portion and a lower larger diameter wall portion,
an upper cylindrical interior wall portion adjoined to the upper smaller diameter wall portion,
a lower open ended cylindrical interior wall portion, which is adjoined to the lower larger diameter wall portion, having an open end;
a socket exterior wall;
a rail bond terminal receiving slot, extending from the open end to a portion of the intermediate frustoconical interior wall portion from the socket interior wall portion to the socket exterior wall, which is adapted to removably receive the rail bond terminal.

20. The rail bond tool according to claim 19, further comprising:
a bent handle removably connected to the socket.

21. The rail bond tool according to claim 20, wherein:
the bent handle comprises a locking angle adjuster for adjusting the angle of the slot of the socket and a lock for locking the angle.

22. The rail bond tool according to claim 19, further comprising:
an L shaped handle removably connected to the socket.

23. The rail bond tool according to claim 19, further comprising:
a handle connected to the socket.

24. The rail bond tool according to claim 19, further comprising:
a straight handle removably connected to the socket.

25. The rail bond tool according to claim 19, wherein:
the rail bond tool is insulated.

26. The rail bond tool according to claim 19, wherein:
the rail bond tool is configured to pry the rail bond from the web of the track rail.

27. The rail bond tool according to claim 19, wherein:
the rail bond frustoconical portion has a rail bond upper smaller diameter portion and a rail bond lower larger diameter portion;
the rail bond further comprises:
a rail bond upper cylindrical portion adjoined to the rail bond upper smaller diameter portion,
a rail bond lower cylindrical wall portion, adjoined to the rail bond lower larger diameter wall portion.

\* \* \* \* \*